(12) United States Patent
Ahn et al.

(10) Patent No.: US 12,188,508 B2
(45) Date of Patent: Jan. 7, 2025

(54) FASTENERS WITH VISUAL INDICATION OF CORRECT INSTALLATION AND METHOD FOR FASTENING

(71) Applicant: The Boeing Company, Chicago, IL (US)

(72) Inventors: Jonathan Y. Ahn, Seattle, WA (US); Joseph D. Anderson, Seattle, WA (US); Shane E. Arthur, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 190 days.

(21) Appl. No.: 18/052,995

(22) Filed: Nov. 7, 2022

(65) Prior Publication Data

US 2023/0279893 A1    Sep. 7, 2023

Related U.S. Application Data

(60) Provisional application No. 63/317,215, filed on Mar. 7, 2022.

(51) Int. Cl.
*F16B 29/00* (2006.01)
*F16B 13/06* (2006.01)
*F16B 31/02* (2006.01)

(52) U.S. Cl.
CPC ............ *F16B 29/00* (2013.01); *F16B 13/06* (2013.01); *F16B 31/02* (2013.01)

(58) Field of Classification Search
CPC ...... F16B 1/0071; F16B 13/06; F16B 13/061; F16B 13/122; F16B 13/124; F16B 13/128; F16B 19/1072; F16B 31/02; F16B 29/00

USPC ...... 411/8, 9, 13, 15, 34, 38, 80.1, 80.6, 501
See application file for complete search history.

(56) References Cited

U.S. PATENT DOCUMENTS

| | | | |
|---|---|---|---|
| 3,279,304 A | 10/1966 | Hopkins | |
| 3,304,830 A * | 2/1967 | Shackelford | F16B 39/284 |
| | | | 29/524.1 |
| 3,322,449 A * | 5/1967 | Becker | F16B 19/1072 |
| | | | 403/334 |
| 3,789,728 A * | 2/1974 | Shackelford | F16B 37/067 |
| | | | 411/34 |

(Continued)

FOREIGN PATENT DOCUMENTS

| DE | 202019004545 | 1/2020 |
|---|---|---|
| EP | 2492516 | 8/2012 |

(Continued)

OTHER PUBLICATIONS

European Patent Office, Extended European Search Report, App. No. 23155675.4 (Jun. 27, 2023).

(Continued)

*Primary Examiner* — Roberta S Delisle
(74) *Attorney, Agent, or Firm* — Walters & Wasylyna LLC

(57) ABSTRACT

A fastener includes a sleeve, a pin, and a visual indicator. The sleeve includes a tubular body. The pin includes a shank. At least a portion of the shank of the pin is configured to extend through the tubular body of the sleeve and to facilitate deformation of a portion of the tubular body into a bulb in response to a force applied to the tubular body of the sleeve by the shank of the pin. The visual indicator is configured to provide a visual verification of correct formation of the bulb.

20 Claims, 26 Drawing Sheets

(56) References Cited

U.S. PATENT DOCUMENTS

| | | | |
|---|---|---|---|
| 3,799,108 A | 3/1974 | Mosow | |
| 3,858,479 A * | 1/1975 | Sekhon | F16B 19/1072 |
| | | | 470/11 |
| 4,170,163 A | 10/1979 | Payne | |
| 4,826,372 A | 5/1989 | Kendall | |
| 4,904,132 A | 2/1990 | Popenoe | |
| 5,051,048 A * | 9/1991 | Maddox | F16B 37/067 |
| | | | 411/34 |
| 5,088,867 A | 2/1992 | Mun | |
| 5,294,223 A * | 3/1994 | Phillips, II | F16B 37/067 |
| | | | 411/113 |
| 6,224,309 B1 | 5/2001 | Yamamoto | |
| 6,247,883 B1 | 6/2001 | Monserratt | |
| 6,425,718 B1 | 7/2002 | Herr et al. | |
| 6,609,865 B2 | 8/2003 | Daigneault | |
| 6,761,520 B1 | 7/2004 | Dise | |
| 8,322,015 B2 | 12/2012 | Pratt et al. | |
| 8,434,984 B2 * | 5/2013 | Toosky | F16B 19/05 |
| | | | 411/362 |
| 8,782,867 B2 | 7/2014 | Verdier | |
| 9,574,597 B2 | 2/2017 | Matteson et al. | |
| 10,018,212 B1 | 7/2018 | Strange et al. | |
| 10,767,677 B2 | 9/2020 | Anasis et al. | |
| 2005/0271491 A1 * | 12/2005 | Opper | F16B 19/086 |
| | | | 411/30 |
| 2008/0138168 A1 * | 6/2008 | Schruff | F16B 37/067 |
| | | | 29/707 |
| 2009/0311066 A1 | 12/2009 | Utille | |
| 2014/0169907 A1 * | 6/2014 | Makino | F16B 37/067 |
| | | | 411/34 |
| 2019/0113063 A1 | 4/2019 | Meiffre et al. | |

FOREIGN PATENT DOCUMENTS

| | | |
|---|---|---|
| EP | 2281120 | 3/2014 |
| GB | 1 114 888 | 5/1968 |
| WO | WO 2020/208215 | 10/2020 |
| WO | WO 2021/89353 | 5/2021 |

OTHER PUBLICATIONS

Industrial Indicators: "Smartbolt DTI," (2022). URL: http://www.smartbolts.com/smartbolt-dti/.

Class C Components: "Fastener Tamper Detection Marking," (2021). URL: https://www.classccomponents.com/bolt-blog/fastener-tamper-detection-marking/.

Australian Mining: "Introducing the iQbolt: A Bolt with Visual Tension Indicator," (Mar. 23, 2015). URL: https://www.australianmining.com.au/news/introducing-the-iqbolt-a-bolt-with-visual-tension-indicator/.

European Patent Office, "Communication pursuant to Article 94(3) EPC," App. No. 23 155 675.4 (Sep. 11, 2024).

* cited by examiner

FASTENERS WITH VISUAL INDICATION OF CORRECT INSTALLATION AND METHOD FOR FASTENING

PRIORITY

This application claims priority from U.S. Ser. No. 63/317,215 filed on Mar. 7, 2022.

FIELD

The present disclosure relates generally to fasteners for securing workpieces together and, more particularly, to one-sided installation fasteners that include a visual indication of correct installation.

BACKGROUND

One-sided fasteners, also referred to as blind fasteners, are commonly used to secure workpieces together when it is difficult or impossible to access one side of one of the workpieces. One-sided fasteners have wide application in the aerospace industry.

Typically, such one-sided fasteners include a pin and an expansion member. The workpiece that is accessible by an end-user may be referred to as the accessible-side workpiece and the workpiece that is inaccessible by the end-user may be referred to as the blind-side workpiece. During installation, the one-sided fastener is inserted into an aperture, extending through the workpieces, from an accessible side of the accessible-side workpiece. Application of a force to the pin deforms the expansion member radially outward and draws the expansion member into engagement with an inaccessible side of the blind-side workpiece. Upon complete expansion of the expansion member, the workpieces are clamped together.

However, one problem with existing one-sided fasteners is that they do not provide a practical means to easily determine if the fastener was installed correctly. Incorrect installation, such as insufficient deformation or excessive deformation of the expansion member after the expansion member is drawn against the blind-side workpiece, may limit the shear and/or tensile load capabilities of the fastener. As such, after installation of the fastener, manual inspection of the expansion member may be required, such as by measuring the deformed expansion member. This inspection process may be extremely time-consuming due to the number of fasteners used in some applications. Additionally, it may be extremely difficult to physically access the expansion member in a confined workspace.

Accordingly, those skilled in the art continue with research and development efforts in the field of one-sided fasteners.

SUMMARY

Disclosed are examples of a fastener, an assembly secured together using a fastener, and a method for fastening a first workpiece and a second workpiece together. The following is a non-exhaustive list of examples, which may or may not be claimed, of the subject matter according to the present disclosure.

In an example, the disclosed fastener includes a sleeve, a pin, and a visual indicator. The sleeve includes a tubular body. The pin includes a shank. At least a portion of the shank of the pin is configured to extend through the tubular body of the sleeve and to facilitate deformation of a portion of the tubular body into a bulb in response to a force applied to the tubular body of the sleeve by the shank of the pin. The visual indicator is configured to provide a visual verification of correct formation of the bulb.

In an example, the disclosed assembly includes a first workpiece, a second workpiece, and a fastener. The first workpiece includes a first-workpiece first side, a first-workpiece second side, and a first aperture extending between the first-workpiece first side and the first-workpiece second side. The second workpiece includes a second-workpiece first side, a second-workpiece second side, and a second aperture extending between the second-workpiece first side and the second-workpiece second side. At least a portion of the second workpiece overlaps at least a portion of the first workpiece and the second aperture is aligned with the first aperture. The fastener is installed from first-workpiece first side of the first workpiece for securing the first workpiece and the second workpiece together. The fastener includes a sleeve, a pin, and a visual indicator. The sleeve includes a sleeve axis, a first sleeve end, a second sleeve end opposite the first sleeve end along the sleeve axis, a sleeve head located at the first sleeve end and seated in the first aperture at the first-workpiece first side, a first tubular-body portion extending from the sleeve head along the sleeve axis and received within the first aperture and the second aperture, a bulb extending from the first tubular-body portion along the sleeve axis and engaged with the second-workpiece second side, and a second tubular-body portion extending from the bulb along the sleeve axis to the second sleeve end. The pin includes a pin axis, a first pin end, a second pin end opposite the first pin end along the pin axis, a pin head located at the first pin end and seated in the sleeve head, and a shank extending from the pin head along the pin axis to the second pin end and received within the first tubular-body portion, the bulb, and the second tubular-body portion. The visual indicator is configured to provide a visual verification of correct formation of the bulb.

In an example, the disclosed method includes steps of: (1) aligning a first aperture of the first workpiece and a second aperture of the second workpiece; (2) inserting a fastener into the first aperture and the second aperture from a first-workpiece first side of the first workpiece, wherein the fastener includes a sleeve including a tubular body that is received by the first aperture and the second aperture, a pin including a shank that is received by the tubular body of the sleeve, and a visual indicator located on at least one of the tubular body of the sleeve and the shank of the pin; (3) deforming a portion of the tubular body into a bulb that engages the second-workpiece second side of the second workpiece in response to a force applied to the tubular body of the sleeve by the shank of the pin; and (4) providing a visual verification of correct formation of the bulb using the visual indicator.

Other examples of the disclosed fastener, assembly, and method will become apparent from the following detailed description, the accompanying drawings, and the appended claims.

DETAILED DESCRIPTION

Figure 1:
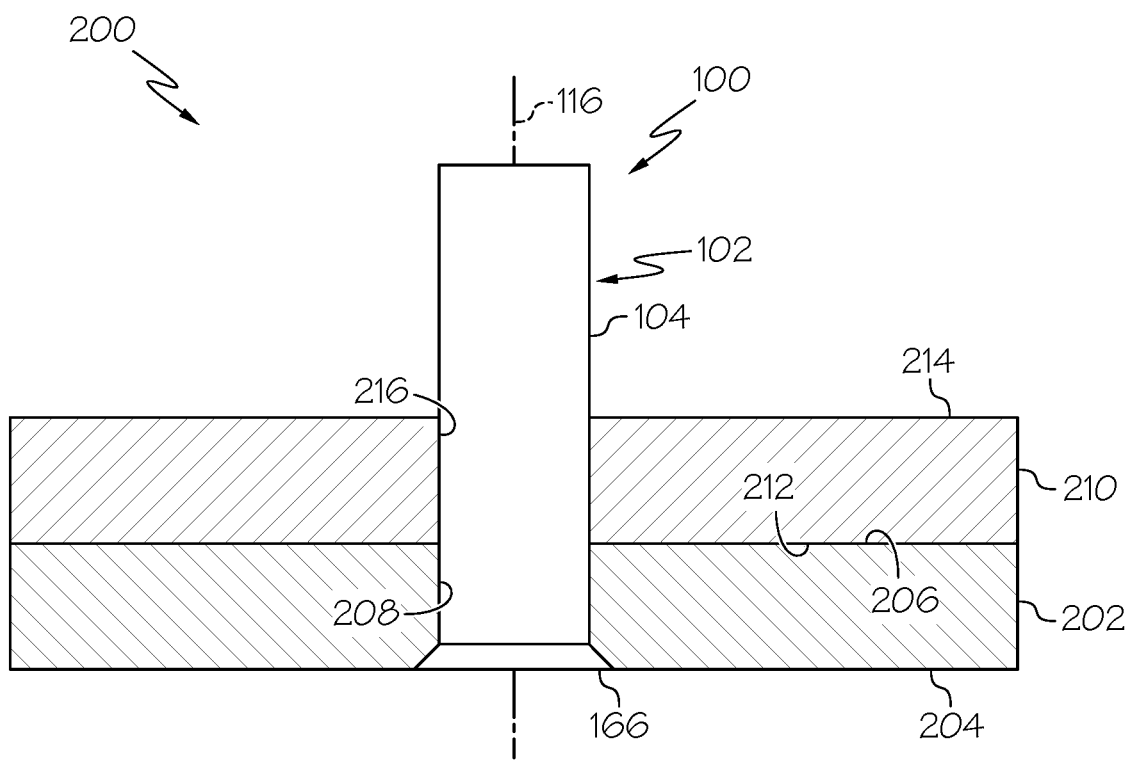
FIG. 1 is a schematic, elevation view, in partial section, of an example of a fastener for securing workpieces together, depicted in an initially installed state.

Referring generally to FIGS. 1-25, 26A and 26B, by way of examples, the present disclosure is directed to a fastener 100. The fastener 100 is a structural one-sided, or blind, fastener for securing or compressively connecting at least two workpieces together. Upon complete installation (e.g., as shown in FIGS. 3, 5, 7, 9, 11, 14, 16, 17, 19-21, 23, 25 and 26B), the fastener 100 is designed to create a clamping force to hold the workpieces together. The fastener 100 is particularly useful in the assembly of components where access to an interior surface of one of the workpieces is not practical or possible, such as in the assembly of a wing box of an aircraft or space vehicle. This application is typically known as a "blind" application. The fastener 100 also provides a visual indication that the fastener 100 has correctly been completely installed.

Referring generally to FIGS. 1-25, 26A and 26B, by way of examples, the present disclosure is also directed to an assembly 200. In one or more examples, the assembly 200 includes a first workpiece 202 and a second workpiece 210. The assembly 200 also includes the fastener 100. The first workpiece 202 and the second workpiece 210 are secured together using the fastener 100.

The assembly 200 may take the form of any assembled structure or a structural component of another structure. In one or more examples, the assembly 200 is a portion of a wing, such as a wing box, of an aircraft. In these examples, the first workpiece 202 is a skin panel and the second workpiece 210 is an interior support structure, such as a spar, a rib, or a stringer, that is coupled to an interior surface of the skin by one or more of the fasteners 100.

Referring to FIGS. 1-11, 13-25, 26A and 26B, in one or more examples, the first workpiece 202 includes a first-workpiece first side 204 (e.g., surface) and a first-workpiece second side 206 (e.g., surface). The first-workpiece first side 204 and the first-workpiece second side 206 face in opposite directions. The first workpiece 202 also includes a first aperture 208 that extends through the first workpiece 202, for example, inclusively, between the first-workpiece first side 204 and the first-workpiece second side 206.

In one or more examples, the second workpiece 210 includes a second-workpiece first side 212 (e.g., surface) and a second-workpiece second side 214 (e.g., surface). The second-workpiece first side 212 and the second-workpiece second side 214 face in opposite directions. The second workpiece 210 also includes a second aperture 216 that extends through the second workpiece 210, for example, inclusively, between the second-workpiece first side 212 and the second-workpiece second side 214.

For the purpose of the present disclosure, items facing in opposite directions, for example, referring to a first side and a second side facing in opposite directions, refers to the items being approximately or substantially parallel but not necessarily exactly parallel to each other.

In one or more examples, at least a portion of the first workpiece 202 and at least a portion of the second workpiece 210 are planar (e.g., have a generally flat profile). However, the first workpiece 202 and/or the second workpiece 210 are not limited to planar shapes. In one or more other examples, at least a portion of the first workpiece 202 and at least a portion of the second workpiece 210 are curved (e.g., have a contour, one or more nonplanar portions, or a complex shape).

In one or more examples, at least a portion of the second workpiece 210 overlaps at least a portion of the first workpiece 202. At least a portion of the first-workpiece second side 206 and at least a portion of the second-workpiece first side 212 are in contact with each other. The second aperture 216 is aligned with the first aperture 208.

For the purpose of the present disclosure, apertures being aligned with each other, for example, referring to a first aperture being aligned with second aperture, refers to the apertures being properly positioned relative to each other for insertion and/or installation of a fastener (e.g., the fastener 100) through the apertures, such as a central bore axis of each one of the apertures being at least approximately parallel to or coincident with each other.

The examples shown in FIGS. 1-11, 13-25, 26A and 26B illustrate only a portion of the assembly 200 in which a portion of the first workpiece 202 and a portion of the second workpiece 210 are secured together by a single instance of the fastener 100. However, the assembly 200 may include any number of fasteners 100.

In the illustrated examples, the first workpiece 202 is accessible by an end-user and may be referred to as the accessible-side workpiece. Therefore, the first-workpiece first side 204 is, and may be referred to as, the accessible side of the assembly 200. The second workpiece 210 is inaccessible by the end-user and may be referred to as the blind-side workpiece. Therefore, the second-workpiece second side 214 is, and may be referred to as, the inaccessible side of the assembly 200.

In one or more examples, the fastener 100 is installed through the first aperture 208 and the second aperture 216 from the first-workpiece first side 204 (e.g., the accessible side) of the first workpiece 202 (e.g., the accessible-side workpiece) for securing the first workpiece 202 and the second workpiece 210 together.

In one or more examples, the first workpiece 202 and the second workpiece 210 are made of materials commonly used in the aerospace industry, such as, but not limited to, aluminum, metallic alloys, composite materials, and the like. While two workpieces are shown in the illustrated examples, the assembly 200 is not limited to two workpieces. For example, a third workpiece (e.g., one or more additional workpieces) may be situated between the first workpiece 202 and the second workpiece 210 (e.g., in contact with the first-workpiece second side 206 and the second-workpiece first side 212) such that a third aperture is aligned with the first aperture 208 and the second aperture 216. In these examples, the fastener 100 is installed through the first aperture 208, the third aperture (e.g., one or more additional apertures), and the second aperture 216 from the first-workpiece first side 204 of the first workpiece 202 for securing the first workpiece 202, the third workpiece, and the second workpiece 210 together.

Referring to FIGS. 1-25, 26A and 26B, in one or more examples, the fastener 100 includes a sleeve 102, a pin 106, and a visual indicator 112. The sleeve 102 includes a tubular body 104. The pin 106 includes a shank 108. At least a portion of the shank 108 of the pin 106 is configured to be received by and extend through the tubular body 104 of the sleeve 102. At least a portion of the shank 108 of the pin 106 is configured to facilitate deformation of a portion of the tubular body 104 into a bulb 110 (e.g., as shown in FIGS. 3, 5, 7, 9, 11, 14, 16, 17, 19-21, 23, 25 and 26B) in response to a force applied to the tubular body 104 of the sleeve 102 by the shank 108 of the pin 106. The visual indicator 112 is configured to provide a visual verification of correct and/or complete formation of the bulb 110.

For the purpose of the present disclosure, the phrases correct formation of the bulb 110, complete formation of the bulb 110, correct installation of the fastener 100, and like phrases refer to a condition, configuration, arrangement, or state of the fastener 100 in which the bulb 110 has been properly formed from a portion of the tubular body 104 of the sleeve 102, the bulb 110 has a desired or proper shape and/or geometry, and/or the bulb 110 is properly seated against the second-workpiece second side 214. As such, the visual indicator 112 enables the correct formation of the bulb 110 to be inferred, estimated, or otherwise verified based on a clearly and easily perceptible visible element or feature of the fastener 100. In other words, the visual indicator 112 provides a visual cue that signals or indicates the correct formation of the bulb 110 without requiring physical inspection of the bulb 110. Conversely, lack of the visual cue provided by the visual indicator 112 signals or indicated incorrect installation or incomplete formation of the bulb 110.

The pin 106 includes any suitable elongated member that is received by the sleeve 102 and that is configured to deform a portion of the sleeve 102 upon application of a force to the pin 106. The pin 106 may take the form of, or may also be referred to as, a bolt, a screw, a spindle, a stem, a rod, or a mandrel. The sleeve 102 includes any suitable elongated tubular member that receives at least a portion of the pin 106 and that is configured to deform and/or to expand radially outward in response to application of a force to the pin 106. The sleeve 102 may take the form of, or may also be referred to as, an expansion member, a bushing, a nut, or a swaging body.

As illustrated in FIGS. 1, 2, 4, 6, 8, 10, 13, 15, 18, 22, 24 and 26A, during initial installation of the fastener 100, the tubular body 104 of the sleeve 102 is inserted through the first aperture 208 and the second aperture 216 such that a portion of the tubular body 104 extends past the second-workpiece second side 214. The pin 106 is received by the sleeve 102 such that shank 108 of the pin 106 extends through the tubular body 104 and a portion of the shank 108 engages a portion of the tubular body 104.

As illustrated in FIGS. 3, 5, 7, 9, 11, 14, 16, 17, 19, 20, 21, 23, 25 and 26B, installation of the fastener 100 is completed by application of a force to the pin 106, which results in application of a force to the tubular body 104 by the shank 108 at an engaging interface between the shank 108 and the tubular body 104. Application of the force to the tubular body 104 by the shank 108 compresses the tubular body 104 and causes a portion of the tubular body 104 to deform (e.g., expand radially outward) into formation of the bulb 110 against the second-workpiece second side 214. Upon complete formation of the bulb 110 (e.g., expansion of the portion of the tubular body 104), the first workpiece 202 and the second workpiece 210 are clamped together.

For the purpose of the present disclosure, the terms "initial installation," "initially installed state," and similar terms refer to a condition, configuration, arrangement, or state of the fastener 100 in which the sleeve 102 is received by (e.g., inserted through) the first aperture 208 and the second aperture 216 and the pin 106 is received by the sleeve 102, but prior to formation of the bulb 110 (e.g., as shown in 1, 2, 4, 6, 8, 10, 13, 15, 18, 22, 24 and 26A).

For the purpose of the present disclosure, the terms "complete installation," "completely installed state," and similar terms refer to a condition, configuration, arrangement, or state of the fastener 100 in which a portion of the tubular body 104 of the sleeve 102 has been deformed, for example, in response to application of a force to the pin 106, to form the bulb 110 (e.g., as shown in FIGS. 3, 5, 7, 9, 11, 14, 16, 17, 19, 20, 21, 23, 25 and 26B).

The visual indicator 112 provides a means to visually inspect and verify that the fastener 100 has been completely and/or correctly installed in a quick and efficient manner. In one or more examples, the visual indicator 112 enables visual verification that the bulb 110 has been correctly formed, that the shape of the bulb 110 is correct, and/or that the bulb 110 is properly seated against the second-workpiece second side 214. The visual indicator 112 facilitates inspection of the fastener 100 on the blind side of assembly 200 without requiring the end-user to physically inspect (e.g., manually measure) the bulb 110 or to enter a confined space defined, at least partially, by the blind side of the assembly 200. In one or more examples, visual inspection of the fastener 100 on the blind side of the assembly 200 may be performed manually without physically accessing the blind side of the fastener 100, such as by using a telescopic mirror, a borescope, or other inspection camera to view the visual indicator 112. In one or more examples, visual inspection of the fastener 100 may be performed automatically, such as by an automated machine-vision inspection system that is configured to access the blind side of the assembly 200.

Referring to FIGS. 1-17, in one or more examples, the visual indicator 112 includes at least one reference mark 114. At least the one reference mark 114 is located on at least one of the shank 108 of the pin 106 and the tubular body 104 of the sleeve 102. In one or more examples, at least the one reference mark 114 is not visible before formation of the bulb 110 and at least the one reference mark 114 is visible after the correct formation of the bulb 110.

Figure 2:
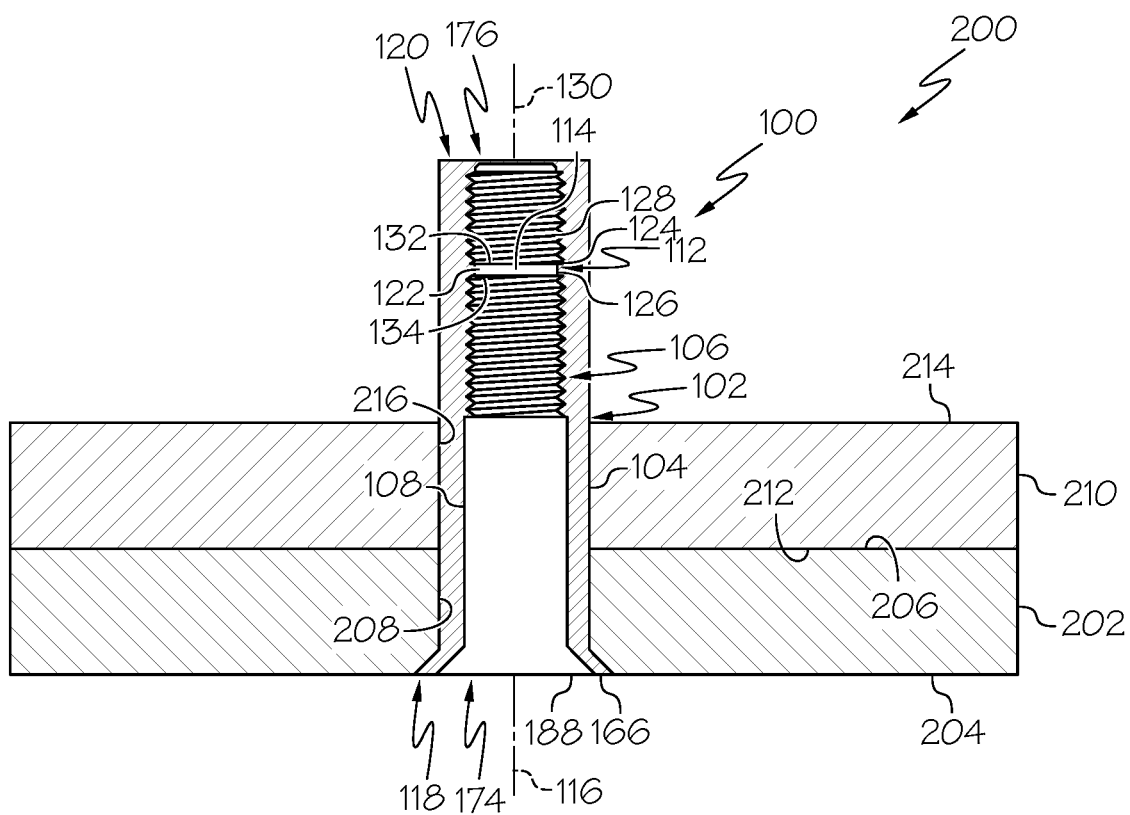
FIG. 2 is a schematic, elevation view, in partial section, of an example of the fastener shown in FIG. 1, depicted in an initially installed state.
Figure 3:
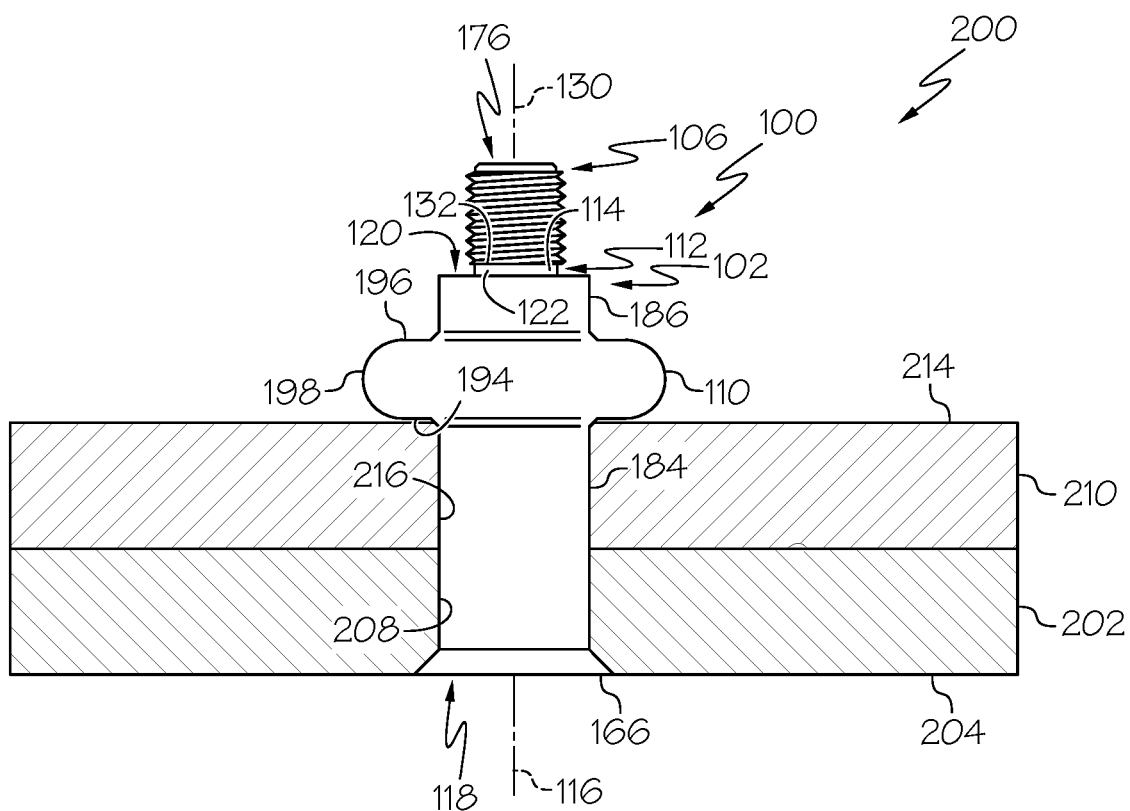
FIG. 3 is a schematic, elevation view, in partial section, of the example of the fastener shown in FIG. 2, depicted in a completely installed state.
Figure 4:
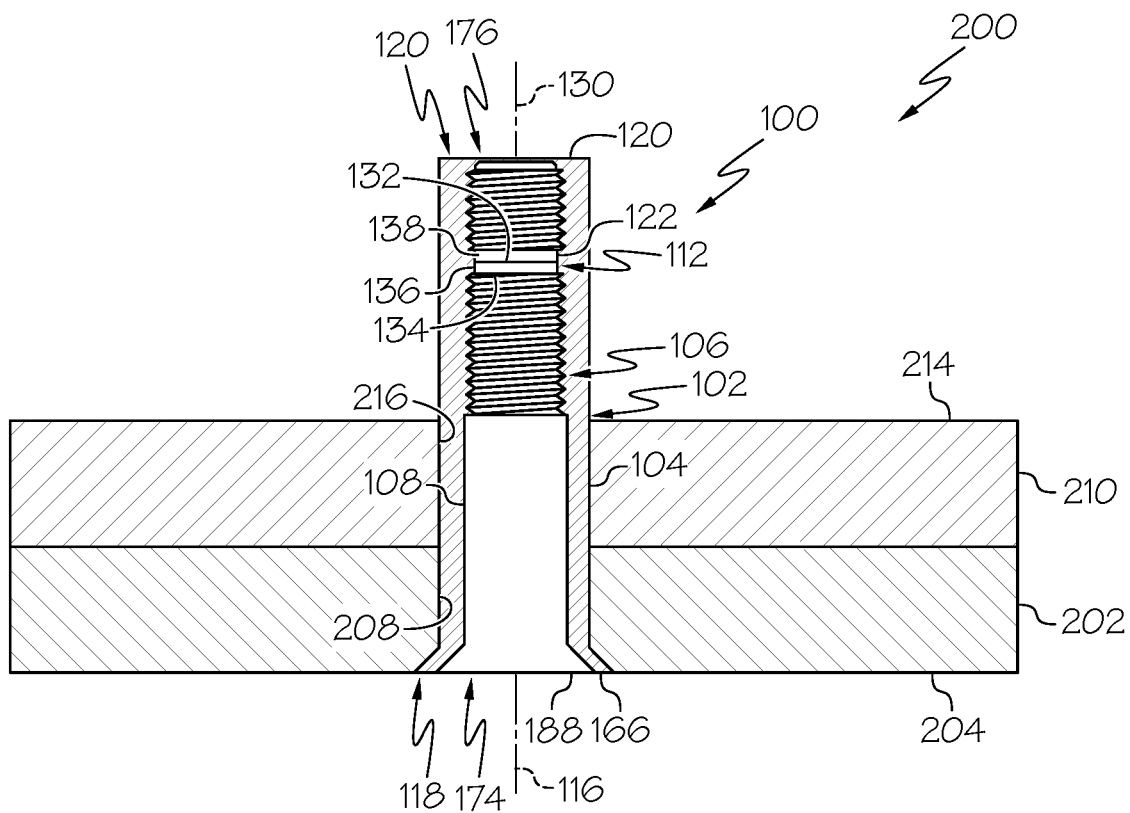
FIG. 4 is a schematic, elevation view, in partial section, of an example of the fastener shown in FIG. 1, depicted in an initially installed state.
Figure 5:
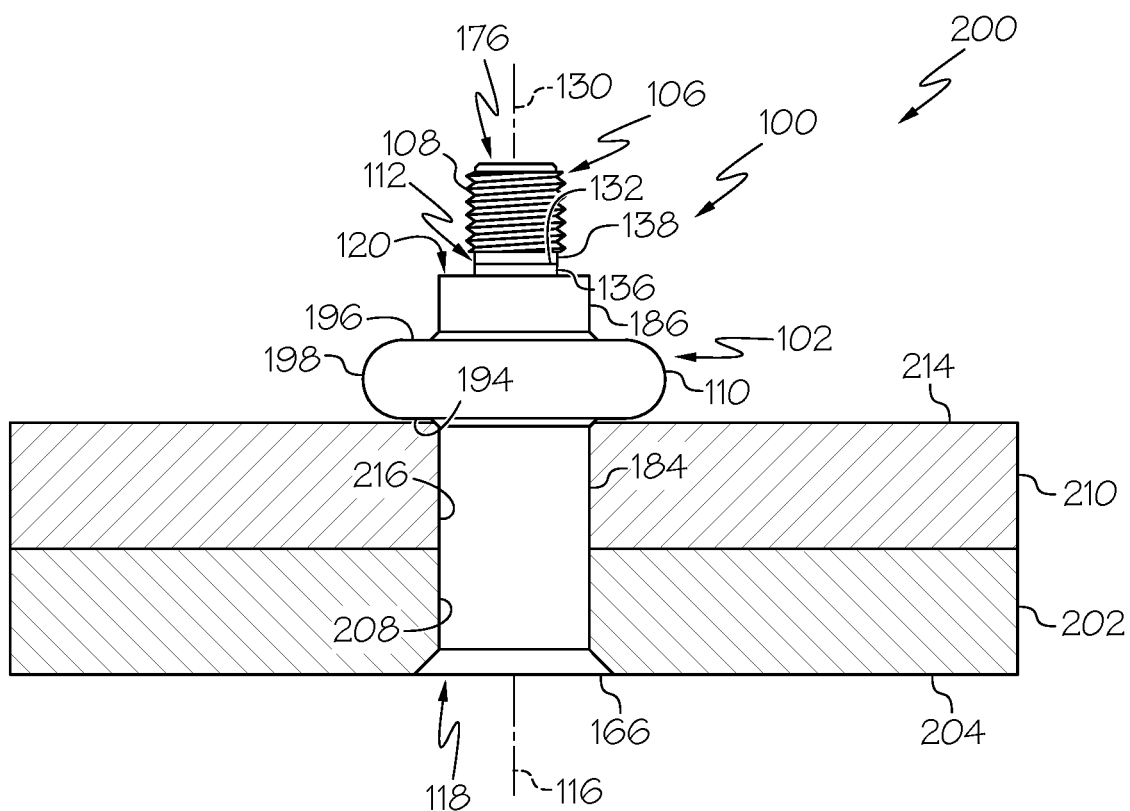
FIG. 5 is a schematic, elevation view, in partial section, of the example of the fastener shown in FIG. 4, depicted in a completely installed state.
Figure 6:
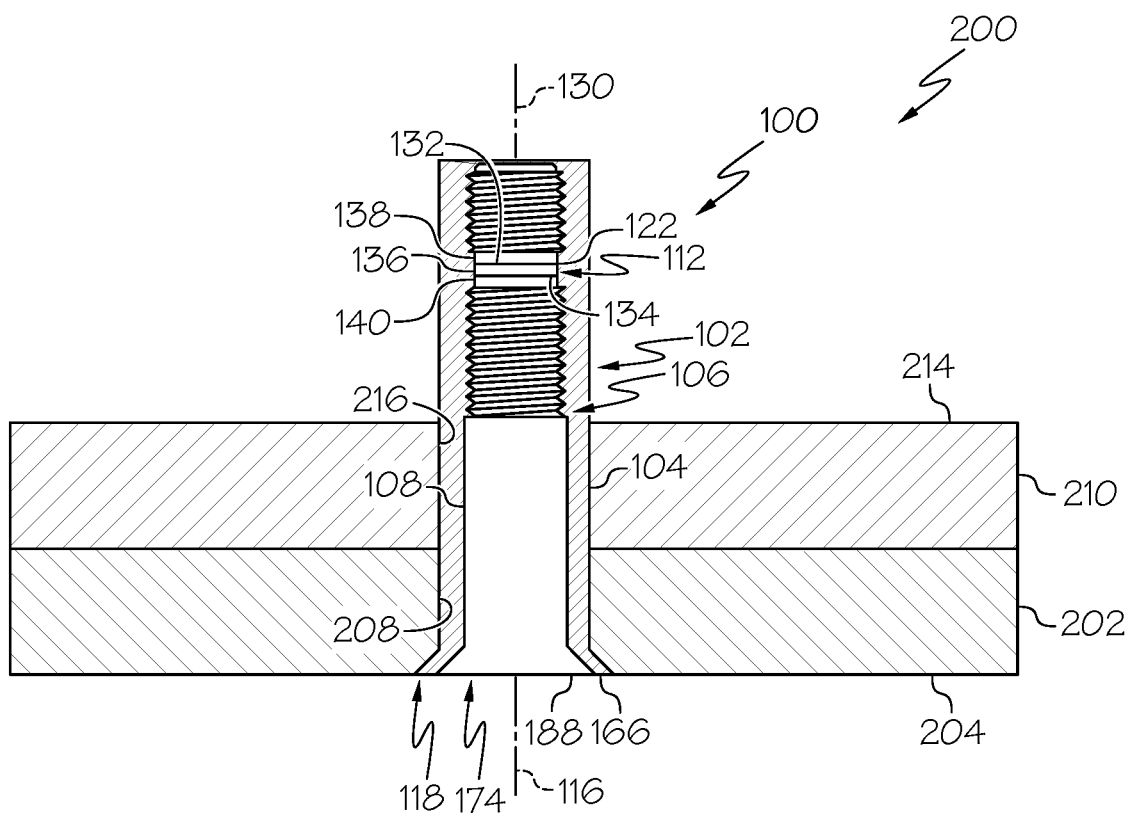
FIG. 6 is a schematic, elevation view, in partial section, of an example of the fastener shown in FIG. 1, depicted in an initially installed state.
Figure 7:
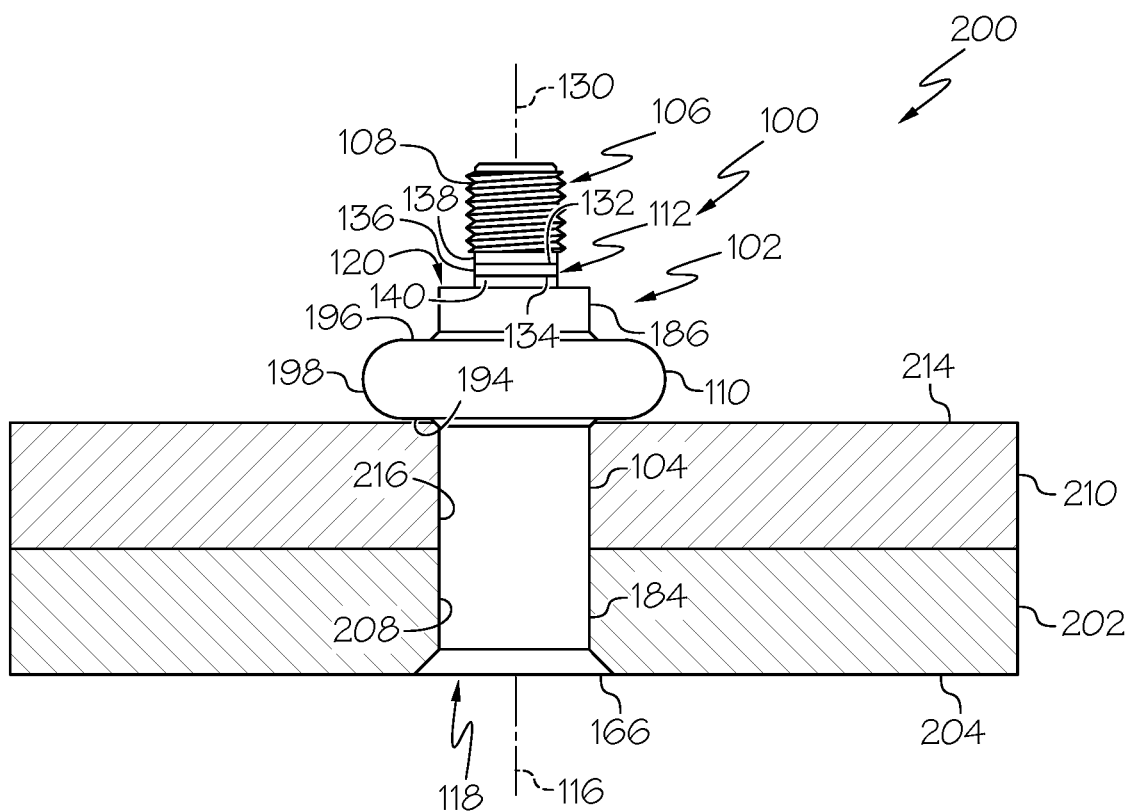
FIG. 7 is a schematic, elevation view, in partial section, of the example of the fastener shown in FIG. 6, depicted in a completely installed state.

As illustrated in FIGS. 2-7, in one or more examples, the reference mark 114 is located on the shank 108 of the pin 106. Upon initial installation of the fastener 100 and prior to formation of the bulb 110 (e.g., as shown in FIGS. 2, 4 and 6), the reference mark 114 is not visible. In these examples, the term not visible refers to the reference mark 114 being covered or otherwise obscured by a portion of the tubular body 104 of the sleeve 102. After complete installation of the fastener 100 and following formation of the bulb 110 (e.g., as shown in FIGS. 3, 5 and 7), at least a portion of the reference mark 114 is visible. In these examples, the term visible refers to at least a portion of the reference mark 114 being exposed by (e.g., uncovered) from the tubular body 104 of the sleeve 102 due to the deformed shape of the tubular body 104 (e.g., formation of the bulb 110). As such, at least a portion of the reference mark 114 being visible indicates that the tubular body 104 has sufficiently changed its shape to infer correct formation of the bulb 110.

Figure 10:
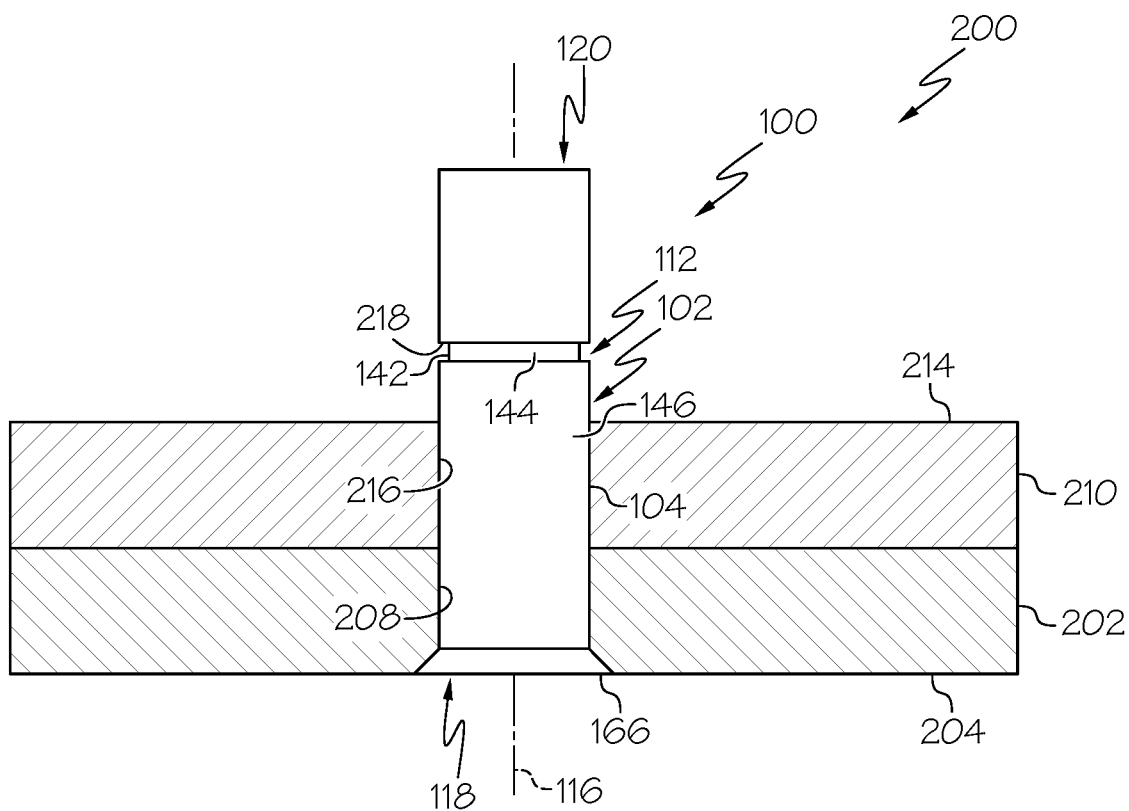
FIG. 10 is a schematic, elevation view, in partial section, of an example of the fastener shown in FIG. 1, depicted in an initially installed state.
Figure 11:
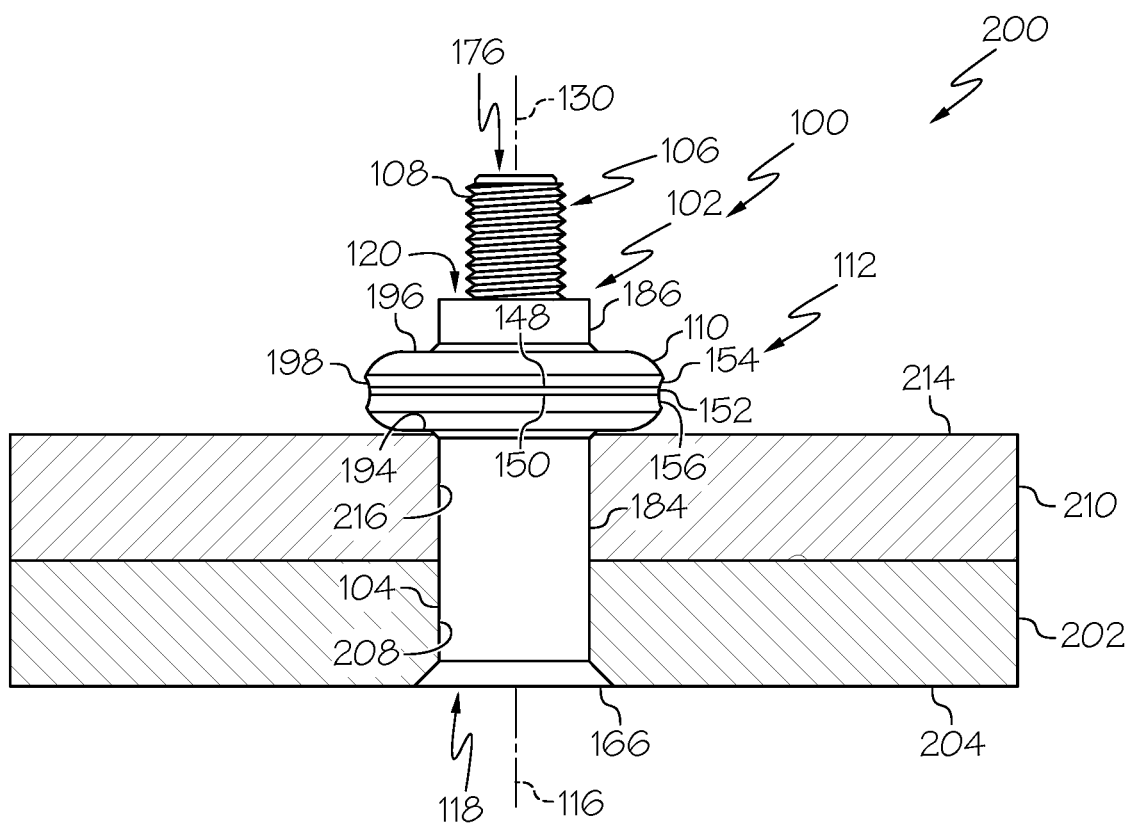
FIG. 11 is a schematic, elevation view, in partial section, of the example of the fastener shown in FIG. 10, depicted in a completely installed state.
Figure 12:
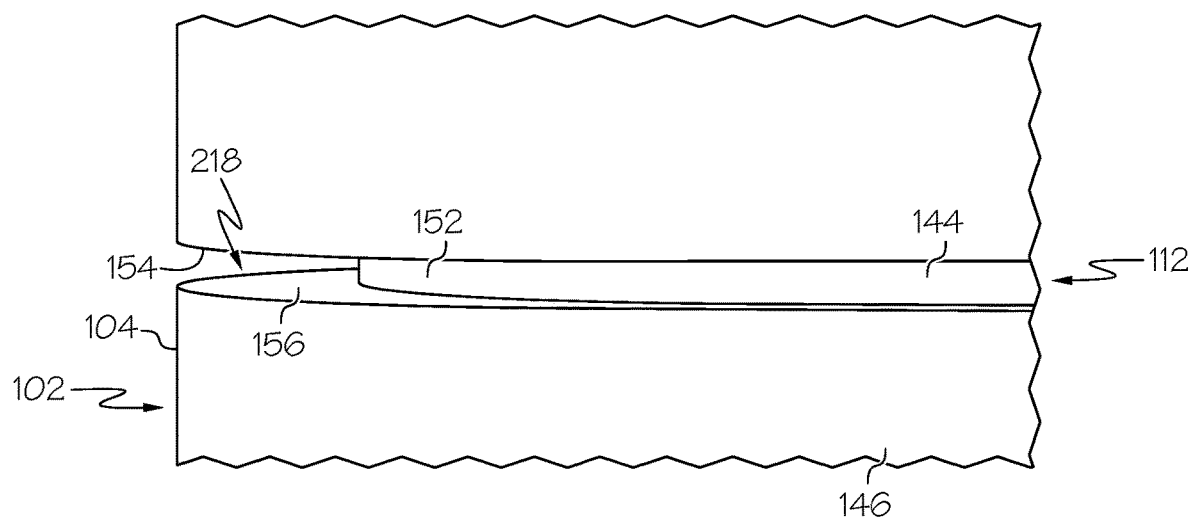
FIG. 12 is a schematic, perspective view of an example of a portion of a sleeve of the fastener shown in FIG. 10.
Figure 13:
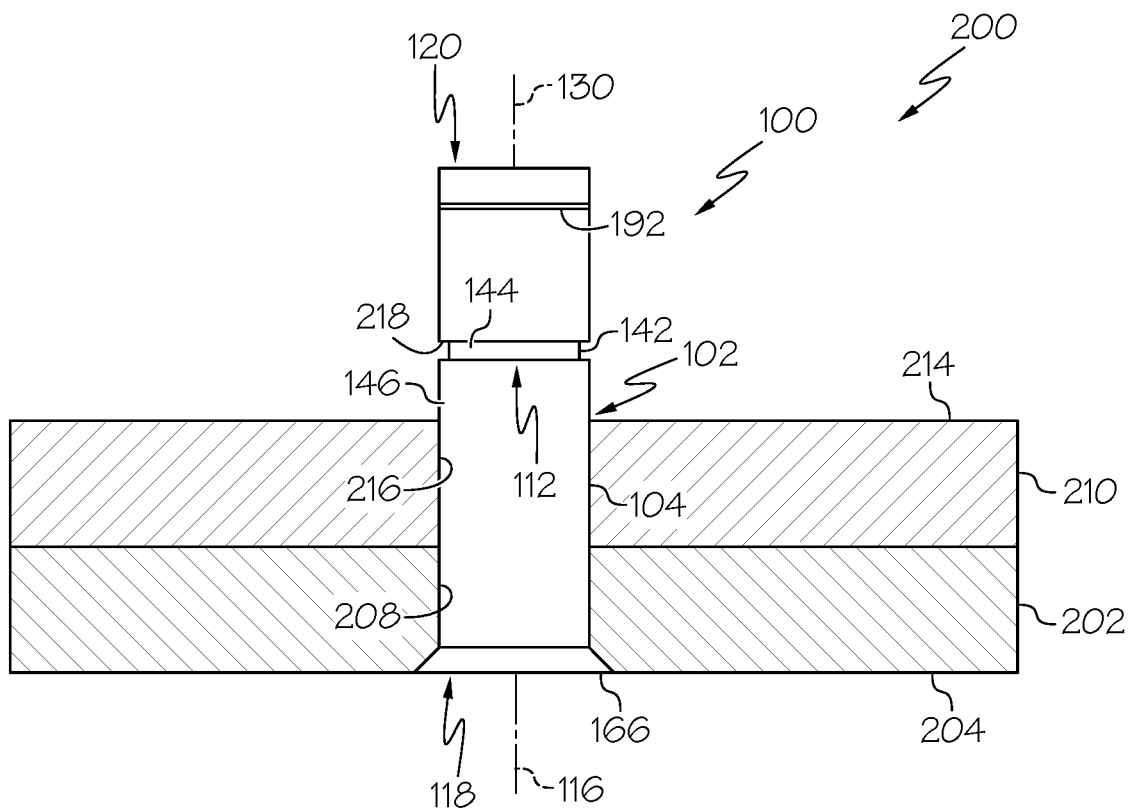
FIG. 13 is a schematic, elevation view, in partial section, of an example of the fastener shown in FIG. 1, depicted in an initially installed state.
Figure 14:
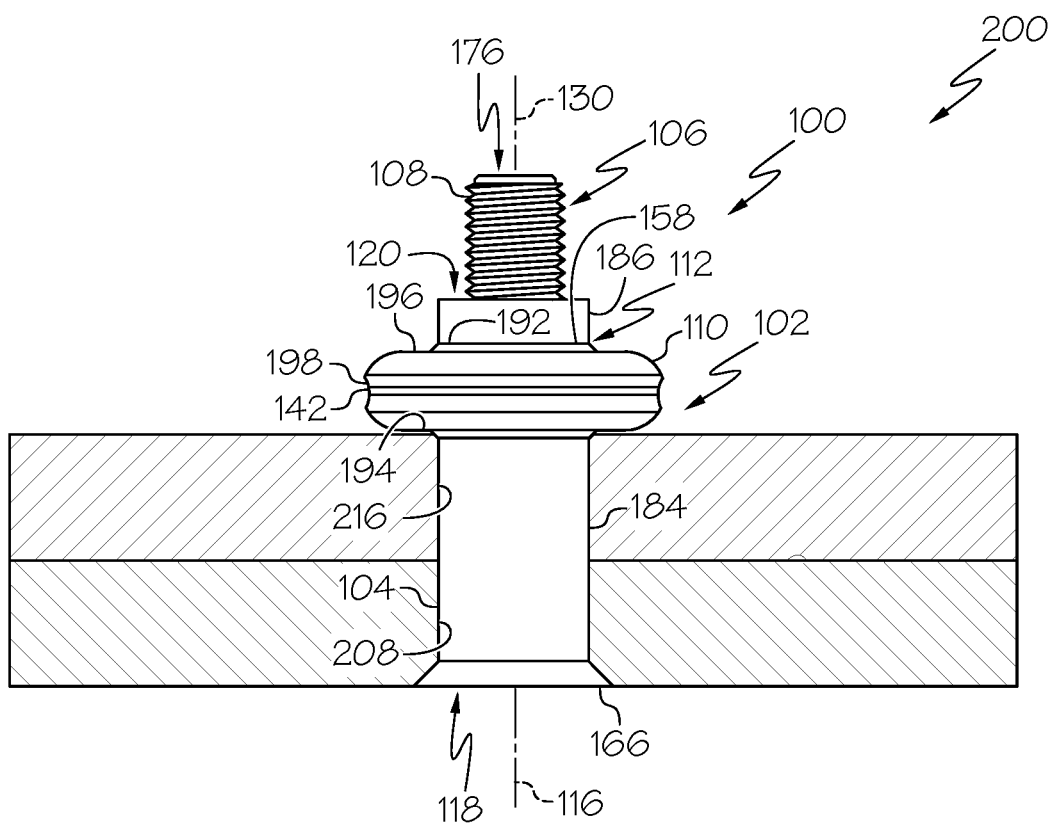
FIG. 14 is a schematic, elevation view, in partial section, of the example of the fastener shown in FIG. 13, depicted in a completely installed state.
Figure 17:
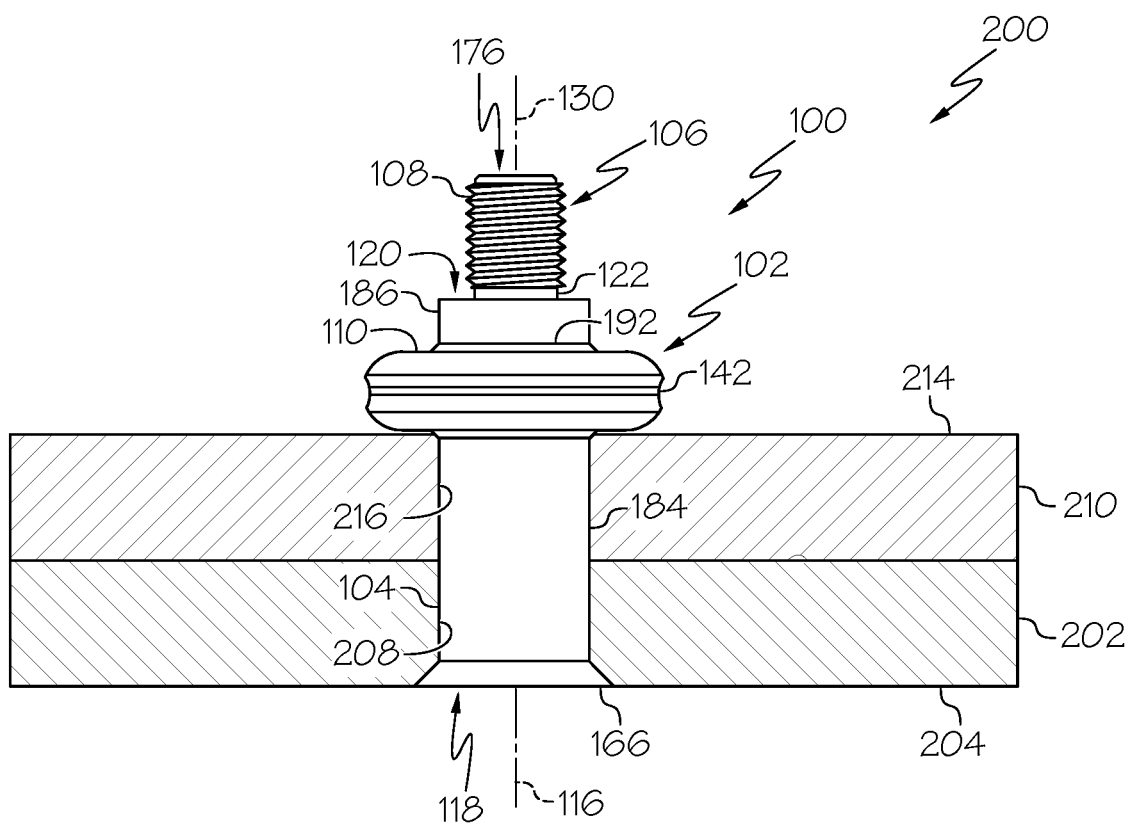
FIG. 17 is a schematic, elevation view, in partial section, of an example of the fastener, depicted in a completely installed state.

As illustrated in FIGS. 10-14 and 17, in one or more examples, the reference mark 114 is located on the tubular body 104 of the sleeve 102. Upon initial installation of the fastener 100 and prior to formation of the bulb 110 (e.g., as shown in FIGS. 10, 12 and 13), the reference mark 114 is not visible. In these examples, the term not visible refers to the reference mark 114 being obscured due to the initial shape of the tubular body 104 of the sleeve 102. After complete installation of the fastener 100 and following formation of the bulb 110 (e.g., as shown in FIGS. 11, 14 and 17), at least a portion of the reference mark 114 is visible. In these examples, the term visible refers to at least a portion of the reference mark 114 being exposed due to the deformed shape of the tubular body 104 of the sleeve 102 (e.g., formation of the bulb 110). As such, at least a portion of the reference mark 114 being visible indicates that the tubular body 104 has sufficiently changed its shape to infer correct formation of the bulb 110.

As illustrated in FIGS. 8, 9, 15 and 16, in one or more examples, the reference mark 114 is located on the tubular body 104 of the sleeve 102. The reference mark 114 has a first position before formation of the bulb 110. The reference mark 114 has a second position after the correct formation of the bulb 110. For example, upon initial installation of the fastener 100 and prior to formation of the bulb 110 (e.g., as shown in FIGS. 10, 12 and 13), the reference mark 114 is in the first (e.g., an initial) position due to the shape of the tubular body 104 of the sleeve 102. After complete installation of the fastener 100 and following formation of the bulb 110 (e.g., as shown in FIGS. 11, 14 and 17), the reference mark 114 is in the second (e.g., completed) position due to the deformed shape of the tubular body 104 of the sleeve 102. As such, the position of the reference mark 114 indicates that the tubular body 104 has sufficiently changed its shape to infer correct formation of the bulb 110.

Figure 18:
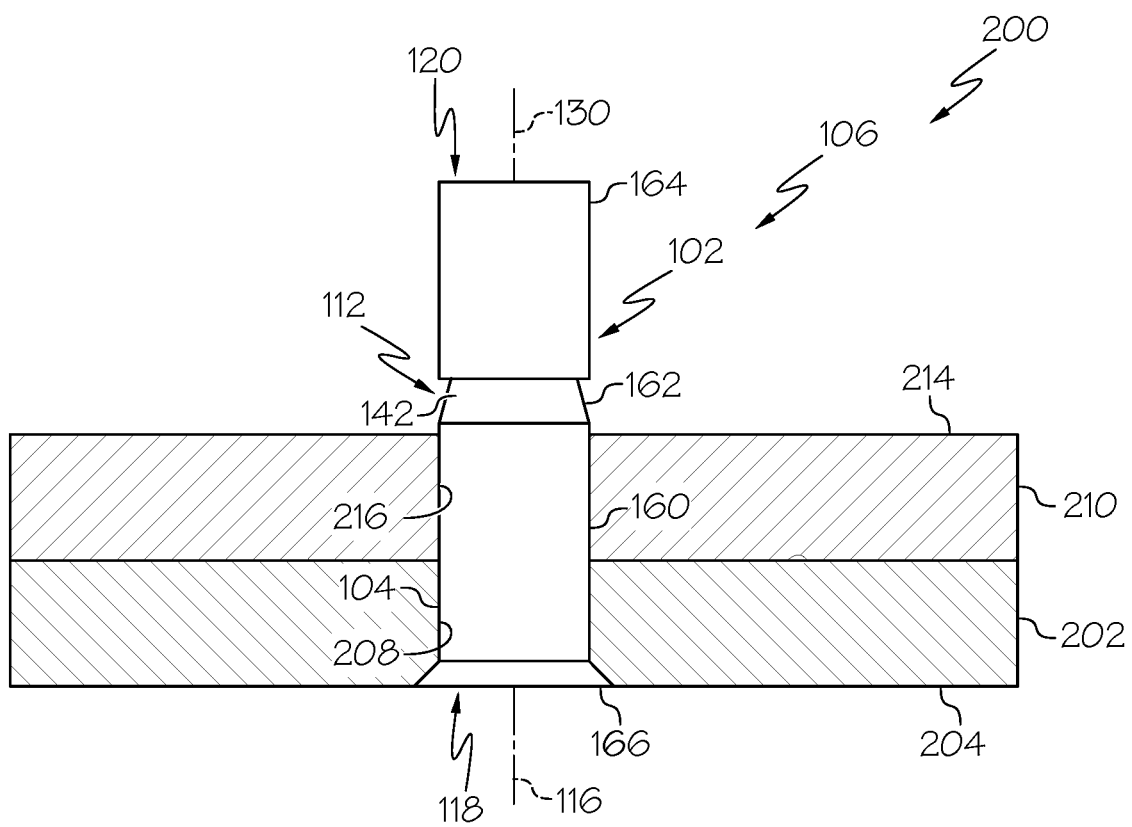
FIG. 18 is a schematic, elevation view, in partial section, of an example of the fastener, depicted in an initially installed state.
Figure 19:
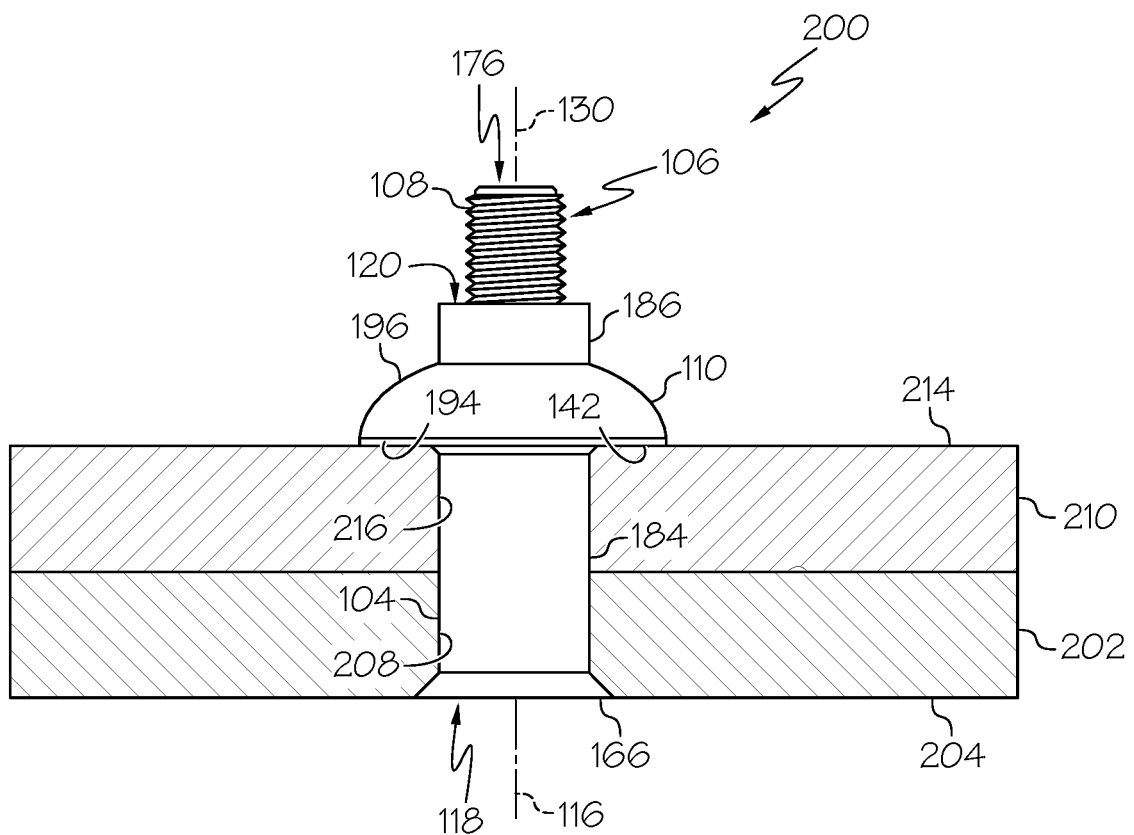
FIG. 19 is a schematic, elevation view, in partial section, of the example of the fastener shown in FIG. 18, depicted in a completely installed state.
Figure 20:
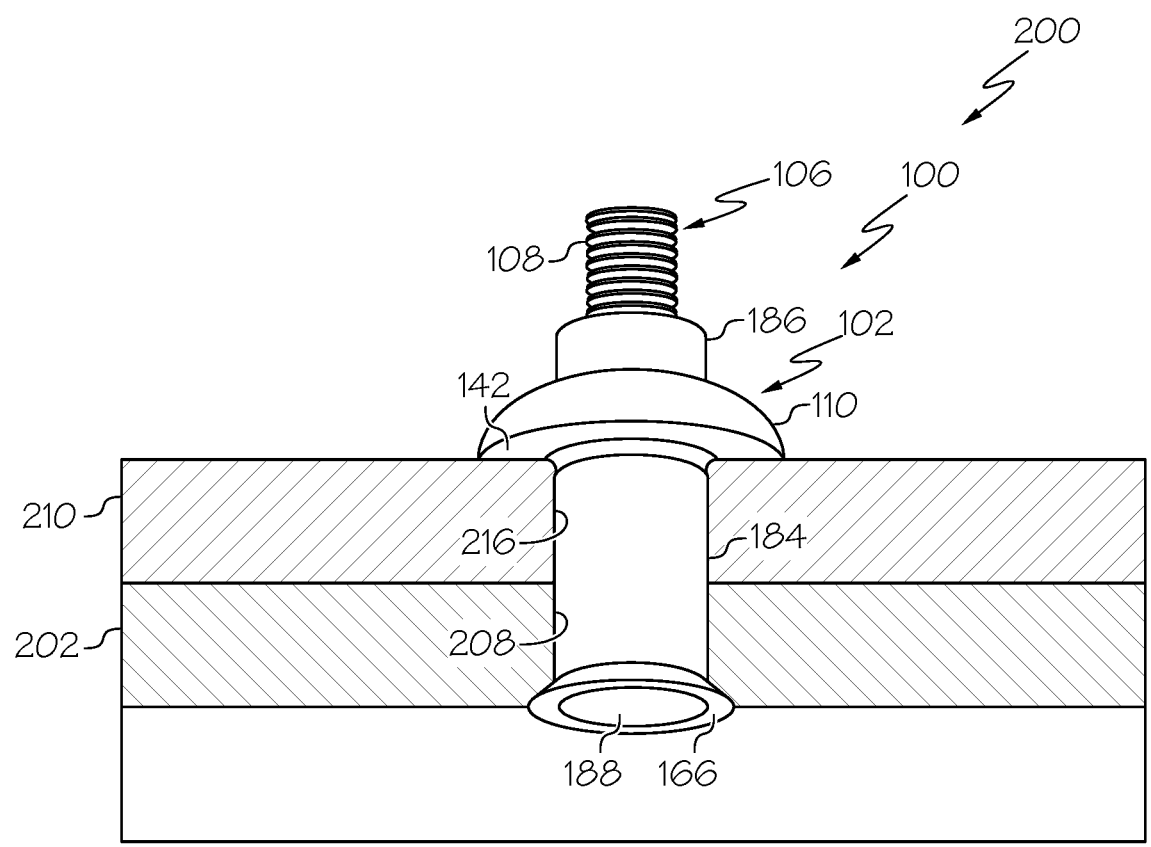
FIG. 20 is a schematic, perspective view, in partial section, of the example of the fastener shown in FIG. 19.

Referring to FIGS. 18-21, in one or more examples, the visual indicator 112 includes at least one reference mark 114. The one reference mark 114 is located on the tubular body 104 of the sleeve 102. The reference mark 114 is visible before formation of the bulb 110. The reference mark 114 is not visible after the correct formation of the bulb 110. For example, upon initial installation of the fastener 100 and prior to formation of the bulb 110 (e.g., as shown in FIG. 18), the reference mark 114 is visible. In these examples, the term visible refers to the reference mark 114 being exposed due to the initial shape of the tubular body 104 of the sleeve 102. After complete installation of the fastener 100 and following formation of the bulb 110 (e.g., as shown in FIGS. 19 and 20), the reference mark 114 is not visible. In these examples, the term not visible refers to the reference mark 114 being covered or otherwise obscured due to the deformed shape of the tubular body 104 of the sleeve 102 (e.g., formation of the bulb 110). As such, the reference mark 114 being not visible indicates that the tubular body 104 has sufficiently changed its shape to infer correct formation of the bulb 110.

Referring to FIGS. 2-7, 17 and 21, in one or more examples, the sleeve 102 includes a sleeve axis 116. The sleeve 102 includes a first sleeve end 118 and a second sleeve end 120 that is opposite the first sleeve end 118 along the sleeve axis 116. The visual indicator 112 includes a shank reference mark 122 that is located on the shank 108 of the pin 106. In these examples, the shank reference mark 122 is an example of the reference mark 114. The correct formation of the bulb 110 is established by a location of the second sleeve end 120 relative to the shank reference mark 122. Before formation of the bulb 110, the shank reference mark 122 is covered by the tubular body 104 of the sleeve 102 (e.g., as shown in FIGS. 2, 4 and 6). After formation of the bulb 110, at least a portion of the shank reference mark 122 being exposed by the second sleeve end 120 visually indicates the correct formation of the bulb 110 (e.g., as shown in FIGS. 3, 5, 7 and 17). As an example, the second sleeve end 120, for example, a second edge of the tubular body 104 at the second sleeve end 120, being located within a region of the shank 108 that includes the shank reference mark 122 (e.g., as shown in FIG. 3) indicates that the tubular body 104 is sufficiently compressed and deformed to infer correct formation of the bulb 110. Conversely, after formation of the bulb 110, the shank reference mark 122 being covered by the second sleeve end 120 visually indicates the incorrect and/or incomplete formation of the bulb 110.

For the purpose of this disclosure, the term "along," in reference to extending along an axis, means coincident with or parallel to that axis.

Referring to FIG. 2, in one or more examples, the shank reference mark 122 includes at least one of an annular recess 124 formed in the shank 108 of the pin 106 and a physical characteristic of an annular portion 126 of a surface 128 of the shank 108 of the pin 106. In one or more examples, the annular portion 126 of the surface 128 of the shank 108 is formed or defined by the annular recess 124 formed in the shank 108, such that the annular portion 126 of the shank 108 has a cross-sectional dimension (e.g., diameter) that is less than a cross-sectional dimension (e.g., diameter) of a remaining portion of the shank 108.

In one or more examples, the physical characteristic of the annular portion 126 of the surface 128 of the shank 108 of the pin 106 includes surface color. For example, a first surface color of the annular portion 126 of the surface 128 of the shank 108 is different from a second surface color of a remaining portion or directly adjacent portion of the surface 128 of the shank 108 such that the first surface color is visibly distinct and easily discernible from the second surface color.

In one or more examples, the physical characteristic of the annular portion 126 of the surface 128 of the shank 108 of the pin 106 includes surface texture. For example, a first surface texture of the annular portion 126 of the surface 128 of the shank 108 is different from a second surface texture of a remaining portion or directly adjacent portion of the surface 128 of the shank 108 such that the first surface texture is visibly distinct and easily discernible from the second surface texture. For example, the annular portion 126 of the surface 128 of the shank 108 may be knurled, cross-hatched, or include other surface characteristics or appearances, and the remaining portion or directly adjacent portion of the surface 128 of the shank 108 may be smooth, threaded, or include different surface characteristics or appearances.

In one or more examples, the physical characteristic of the annular portion 126 of the surface 128 of the shank 108 of the pin 106 includes surface reflectivity. For example, a first surface reflectivity of the annular portion 126 of the surface 128 of the shank 108 is different from a second surface reflectivity of a remaining portion or directly adjacent portion of the surface 128 of the shank 108 such that the first surface reflectivity is visibly distinct and easily discernible from the second surface reflectivity. For example, the annular portion 126 of the surface 128 of the shank 108 may have a relatively high reflectivity, and the remaining portion or directly adjacent portion of the surface 128 of the shank 108 may have a relatively low reflectivity.

In one or more examples, the physical characteristic of the annular portion 126 of the surface 128 of the shank 108 of the pin 106 includes another surface characteristic such that the annular portion 126 of the surface 128 of the shank 108 is visibly distinct and easily discernible from the remaining portion or directly adjacent portion of the surface 128 of the shank 108. For example, the annular portion 126 of the surface 128 of the shank 108 may be fluorescent or phosphorescent, and the remaining portion or directly adjacent portion of the surface 128 of the shank 108 may not be fluorescent or phosphorescent.

In one or more examples, the physical characteristic of the annular portion 126 of the surface 128 of the shank 108 of the pin 106 includes a combination of at least two of surface color, surface texture, and surface reflectivity.

Referring to FIGS. 2-7, in one or more examples, the pin 106 includes a pin axis 130. The shank reference mark 122 includes a first shank-reference-mark end 132 and a second shank-reference-mark end 134 that is opposite the first shank-reference-mark end 132 along the pin axis 130. The first shank-reference-mark end 132 is located at a minimum limit for the correct formation of the bulb 110. The second shank-reference-mark end 134 is located at a maximum limit for the correct formation of the bulb 110. After formation of the bulb 110 (e.g., as shown in FIG. 3), the second sleeve end 120 of the sleeve 102 being located between the first shank-reference-mark end 132 and the second shank-reference-mark end 134 visually indicates the correct formation of the bulb 110.

For example, upon application of a force to the pin 106, the shank 108 of the pin 106 applies a force to the tubular body 104 of the sleeve 102 that compresses the tubular body 104 along the sleeve axis 116 (e.g., draws or urges the second sleeve end 120 toward the first sleeve end 118) and deforms a portion of the tubular body 104 to form the bulb 110 (e.g., as shown in FIG. 3). The minimum limit for the correct formation of the bulb 110 refers to a position of the second sleeve end 120 along the shank 108 that indicates or infers a lower limit for sufficient compression and/or deformation of the tubular body 104 for correct formation of the bulb 110. As such, the second sleeve end 120 being between the first shank-reference-mark end 132 and the second pin end 176 (e.g., the shank reference mark 122 being completely covered by the tubular body 104) visually indicates insufficient compression and/or deformation of the tubular body 104 and, thus, incomplete or incorrect formation of the bulb 110. The maximum limit for the correct formation of the bulb 110 refers to a position of the second sleeve end 120 along the shank 108 that indicates or infers an upper limit for sufficient compression and/or deformation of the tubular body 104 for correct formation of the bulb 110. As such, the second sleeve end 120 being between the second shank-reference-mark end 134 and the first pin end 174 (e.g., the shank reference mark 122 being completely exposed by the tubular body 104) visually indicates over compression and/or over deformation of the tubular body 104 and, thus, excessive or incorrect formation of the bulb 110.

Referring to FIGS. 4 and 5, in one or more examples, the shank reference mark 122 includes a first shank-reference-mark portion 136 and a second shank-reference-mark portion 138. The first shank-reference-mark portion 136 extends between the first shank-reference-mark end 132 and the second shank-reference-mark end 134. The second shank-reference-mark portion 138 extends from the first shank-reference-mark end 132 along the pin axis 130. After formation of the bulb 110 (e.g., as shown in FIG. 5), at least a portion of the second shank-reference-mark portion 138 being exposed by the second sleeve end 120 visually indicates that formation of the bulb 110 is beyond the minimum limit for the correct formation of the bulb 110.

In one or more examples, the first shank-reference-mark portion 136 includes a first physical characteristic. The second shank-reference-mark portion 138 includes a second physical characteristic. The first physical characteristic and the second physical characteristic are different such that the first shank-reference-mark portion 136 is visibly distinct and easily discernible from the second shank-reference-mark portion 138. For example, the first shank-reference-mark portion 136 includes at least one of a surface color, a surface texture, a surface reflectivity, or other surface characteristic, and the second shank-reference-mark portion 138 includes at least one of a different surface color, a different surface texture, a different surface reflectivity, or different surface characteristic.

Referring to FIGS. 6 and 7, in one or more examples, the shank reference mark 122 includes the first shank-reference-mark portion 136 and a third shank-reference-mark portion 140. The first shank-reference-mark portion 136 extends between the first shank-reference-mark end 132 and the second shank-reference-mark end 134. The third shank-reference-mark portion 140 extends from the second shank-reference-mark end 134 along the pin axis 130. After formation of the bulb 110 (e.g., as shown in FIG. 7), at least a portion of the third shank-reference-mark portion 140 being exposed by the second sleeve end 120 visually indicates that formation of the bulb 110 is beyond the maximum limit for the correct formation of the bulb 110.

In one or more examples, the first shank-reference-mark portion 136 includes the first physical characteristic. The third shank-reference-mark portion 140 includes a third physical characteristic. The first physical characteristic and the third physical characteristic are different such that the first shank-reference-mark portion 136 is visibly distinct and easily discernible from the third shank-reference-mark portion 140. For example, the first shank-reference-mark portion 136 includes at least one of a surface color, a surface texture, a surface reflectivity, or other surface characteristic, and the third shank-reference-mark portion 140 includes at least one of a different surface color, a different surface texture, a different surface reflectivity, or different surface characteristic.

Referring still to FIGS. 6 and 7, in one or more examples, the shank reference mark 122 includes the first shank-reference-mark portion 136, the second shank-reference-mark portion 138, and the third shank-reference-mark portion 140. The first shank-reference-mark portion 136 extends between the first shank-reference-mark end 132 and the second shank-reference-mark end 134. The second shank-reference-mark portion 138 extends from the first shank-reference-mark end 132 along the pin axis 130. The third shank-reference-mark portion 140 extends from the second shank-reference-mark end 134 along the pin axis 130, opposite the second shank-reference-mark portion 138. After formation of the bulb 110 (e.g., as shown in FIG. 7), at least a portion of the second shank-reference-mark portion being exposed by the second sleeve end 120 visually indicates that formation of the bulb 110 is beyond the minimum limit for the correct formation of the bulb 110. After formation of the bulb 110 (e.g., as shown in FIG. 7), at least a portion of the third shank-reference-mark portion 140 being exposed by the second sleeve end 120 visually indicates that formation of the bulb 110 is beyond the maximum limit for the correct formation of the bulb 110.

In one or more examples, the first shank-reference-mark portion 136 includes the first physical characteristic. The second shank-reference-mark portion includes the second physical characteristic. The third shank-reference-mark portion 140 includes the third physical characteristic. In one or more examples, the first physical characteristic, the second physical characteristic, and the third physical characteristic are different, such that the first shank-reference-mark portion 136, the second shank-reference-mark portion 138, and the third shank-reference-mark portion 140 are visibly distinct and easily discernible from each other. In one or more examples, the first physical characteristic is different than the second physical characteristic and the third physical characteristic, such that the first shank-reference-mark portion 136 is visibly distinct and easily discernible from the second shank-reference-mark portion 138 and the third shank-reference-mark portion 140.

Referring to FIGS. 8-14 and 17, in one or more examples, the visual indicator 112 includes a sleeve reference mark 142 that is located on the tubular body 104 of the sleeve 102. In these examples, the sleeve reference mark 142 is an example of the reference mark 114. The correct formation of the bulb 110 is established by a location of the sleeve reference mark 142 relative to the bulb 110. Before formation of the bulb 110, the sleeve reference mark 142 is at least partially obscured and/or is initially positioned due to the initial shape of the tubular body 104. After formation of the bulb 110 (e.g., as shown in FIGS. 9, 11, 14 and 17), the sleeve reference mark 142 being exposed, being located along a middle of the bulb 110 and/or being perpendicular to the sleeve axis 116 visually indicates the correct formation of the bulb 110.

Referring generally to FIGS. 3, 5, 7, 9, 11, 14, 16, 17, 19-21, 23, 25 and 26B, upon correct formation of the bulb 110, the bulb 110 has a desired geometry. It can be appreciated that the geometry of the bulb 110, when correctly formed, may vary depending on the type of the fastener 100 and/or configuration of the tubular body 104.

As shown in FIGS. 3, 5, 7, 9, 11, 14, 16, 17, 23, 25 and 26B, in one or more examples, the bulb 110 has a generally torus shape that circumscribes and extends outward from the sleeve axis 116. In one or more examples, when correctly formed, the bulb 110 is at least approximately symmetric about the sleeve axis 116. In one or more examples, when correctly formed, the bulb 110 is at least approximately symmetric about an axis that is perpendicular to the sleeve axis 116.

Figure 9:
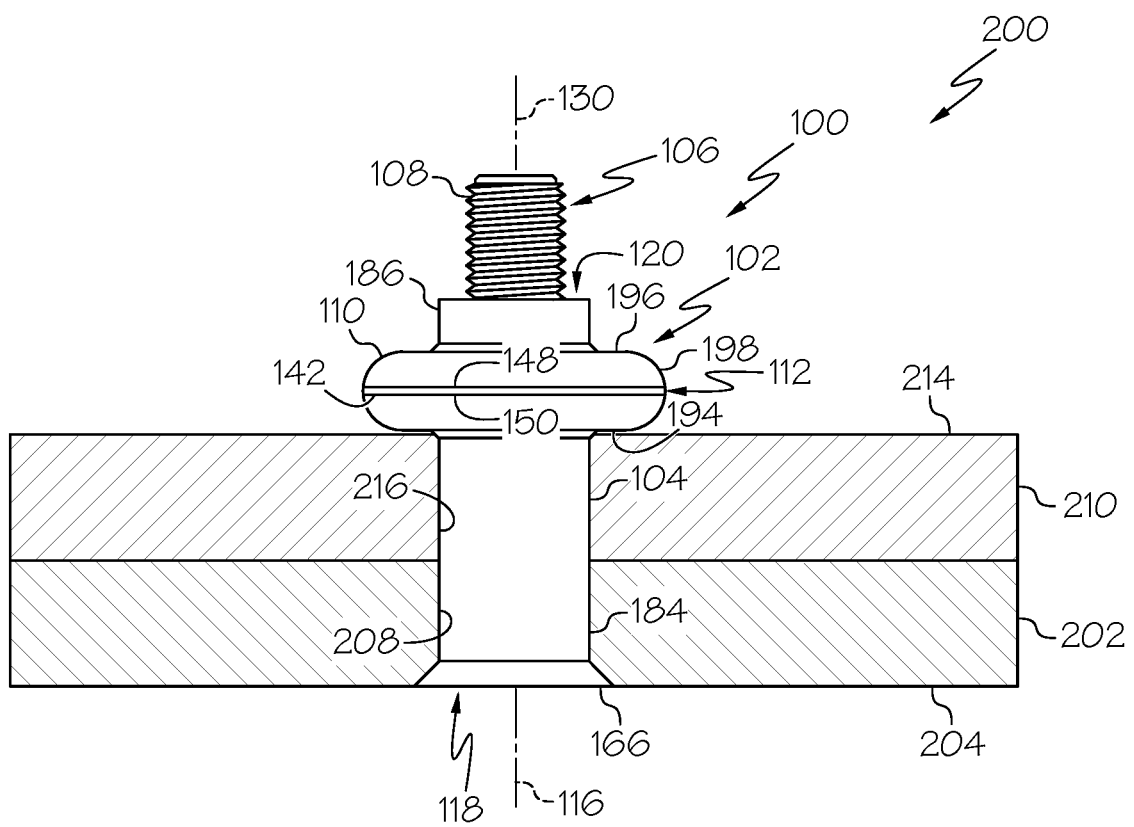
FIG. 9 is a schematic, elevation view, in partial section, of the example of the fastener shown in FIG. 8, depicted in a completely installed state.

Referring briefly to FIG. 9, in one or more examples, when correctly formed, the bulb 110 includes a first bulb side 194 (e.g., first surface), a second bulb side 196 (e.g., second surface), and a third bulb side 198 (e.g., third surface). In one or more examples, the first bulb side 194 is at least approximately planar and is in contact with the second-workpiece second side 214. The second bulb side 196 (e.g., second surface) is spaced away from the first bulb side 194 along the sleeve axis 116. In one or more examples, the first bulb side 194 and the second bulb side 196 are at least approximately parallel to each other and/or at least approximately perpendicular to the sleeve axis 116. However, in other examples, the first bulb side 194 and the second bulb side 196 may be oblique to each other and/or oblique to the sleeve axis 116 (e.g., as shown in FIG. 26B). The third bulb side 198 extends between the first bulb side 194 and the second bulb side 196. In one or more examples, the third bulb side 198 is convex or is curved outward relative to an axis that is perpendicular to the sleeve axis 116 (e.g., as shown in FIGS. 3, 5, 7, 9, 16, 25 and 26B). In one or more examples, the third bulb side 198 is concave or is curved inward relative to an axis that is perpendicular to the sleeve axis 116 (e.g., as shown in FIGS. 11, 14 and 17).

Referring again to FIGS. 8-14 and 17, for the purpose of the present disclosure, the middle of the bulb 110 refers to a portion of the third bulb side 198 that is at least approximately centrally located between the first bulb side 194 and the second bulb side 196. Accordingly, upon formation of the bulb 110 (e.g., as shown in FIGS. 9, 11, 14 and 17), the sleeve reference mark 142 being at least approximately centrally located between the first bulb side 194 and the second bulb side 196 and/or being at least approximately perpendicular to the sleeve axis 116, when viewed in a direction perpendicular to the sleeve axis 116, visually indicates the correct formation of the bulb 110. Conversely, upon formation of the bulb 110, the sleeve reference mark 142 being non-centrally located (e.g., being closer to one of the first bulb side 194 and the second bulb side 196 than the other) and/or being non-perpendicular to the sleeve axis 116, when viewed in a direction perpendicular to the sleeve axis 116, visually indicates the incorrect formation of the bulb 110.

Figure 8:
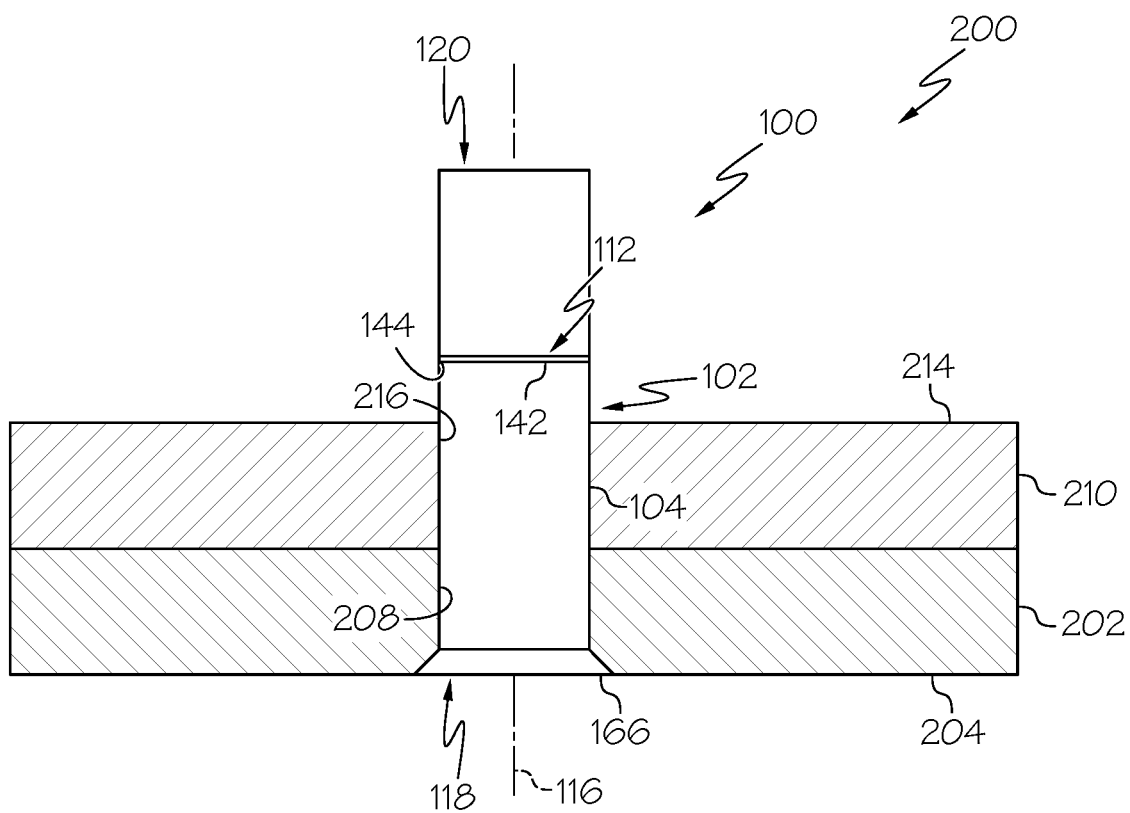
FIG. 8 is a schematic, elevation view, in partial section, of an example of the fastener shown in FIG. 1, depicted in an initially installed state.

Referring to FIGS. 8-12, in one or more examples, upon initial installation the sleeve reference mark 142 is annular, circumscribes the sleeve axis 116, and/or extends circumferentially around a portion of an external surface 146 of the tubular body 104. As an example, the sleeve reference mark 142 is an annular portion 144 (e.g., a strip) of the external surface 146 of the tubular body 104 of the sleeve 102 (e.g., as shown in FIG. 8). As another example, the annular portion 144 of the external surface 146 of the tubular body 104 is formed or defined by an annular recess 218 formed in the tubular body 104, such that the annular portion 144 of the external surface 146 of the tubular body 104 has a cross-sectional dimension (e.g., diameter) that is less than a cross-sectional dimension (e.g., diameter) of a remaining portion of the external surface 146 of the tubular body 104 (e.g., as shown in FIGS. 10 and 12). In these examples, upon correct formation of the bulb 110, the sleeve reference mark 142 is annular, circumscribes the sleeve axis 116, and extends circumferentially around a portion of the third bulb side 198 of the bulb 110 of the sleeve 102 (e.g., as shown in FIGS. 9 and 11).

Referring to FIG. 8, in one or more examples, the sleeve reference mark 142 includes a physical characteristic of the annular portion 144 of the external surface 146 of the tubular body 104 of the sleeve 102.

In one or more examples, the physical characteristic of the annular portion 144 of the external surface 146 of the tubular body of the sleeve 102 includes surface color. For example, a first surface color of the annular portion 144 of the external surface 146 of the tubular body 104 is different from a second surface color of a remaining portion or directly adjacent portion of the external surface 146 of the tubular body 104 such that the first surface color is visibly distinct and easily discernible from the second surface color.

In one or more examples, the physical characteristic of the annular portion 144 of the external surface 146 of the tubular body of the sleeve 102 includes surface texture. For example, a first surface texture of the annular portion 144 of the external surface 146 of the tubular body 104 is different from a second surface texture of a remaining portion or directly adjacent portion of the external surface 146 of the tubular body 104 such that the first surface texture is visibly distinct and easily discernible from the second surface texture. For example, the annular portion 144 of the external surface 146 of the tubular body 104 may be knurled, cross-hatched, or include other surface characteristics or appearances, and the remaining portion or directly adjacent portion of the external surface 146 of the tubular body 104 may be smooth, threaded, or include different surface characteristics or appearances.

In one or more examples, the physical characteristic of the annular portion 144 of the external surface 146 of the tubular body of the sleeve 102 includes surface reflectivity. For example, a first surface reflectivity of the annular portion 144 of the external surface 146 of the tubular body 104 is different from a second surface reflectivity of a remaining portion or directly adjacent portion of the external surface 146 of the tubular body 104 such that the first surface reflectivity is visibly distinct and easily discernible from the second surface reflectivity. For example, the annular portion 144 of the external surface 146 of the tubular body 104 may have a relatively high reflectivity, and the remaining portion or directly adjacent portion of the external surface 146 of the tubular body 104 may have a relatively low reflectivity.

In one or more examples, the physical characteristic of the annular portion 144 of the external surface 146 of the tubular body 104 of the sleeve 102 includes another surface characteristic such that the annular portion 144 of the external surface 146 of the tubular body 104 is visibly distinct and easily discernible from the remaining portion or directly adjacent portion of the external surface 146 of the tubular body 104. For example, the annular portion 144 of the external surface 146 of the tubular body 104 may be fluorescent or phosphorescent, and the remaining portion or directly adjacent portion of the external surface 146 of the tubular body 104 may not be fluorescent or phosphorescent.

In one or more examples, the physical characteristic of the annular portion 144 of the external surface 146 of the tubular body of the sleeve 102 includes a combination of at least two of surface color, surface texture, and surface reflectivity.

Referring to FIGS. 10 and 11, in one or more examples, the sleeve reference mark 142 includes a first sleeve-reference-mark end 148 and a second sleeve-reference-mark end 150 that is opposite the first sleeve-reference-mark end 148 along the sleeve axis 116. After formation of the bulb 110 (e.g., as shown in FIG. 11), the first sleeve-reference-mark end 148 and the second sleeve-reference-mark end 150 being at least approximately parallel to each other and/or at least approximately perpendicular to the sleeve axis 116 visually indicates the correct formation of the bulb 110.

Referring to FIGS. 11 and 12, in one or more examples, the sleeve reference mark 142 includes a first sleeve-reference-mark portion 152, a second sleeve-reference-mark portion 154, and a third sleeve-reference-mark portion 156. The second sleeve-reference-mark portion 154 extends from the first sleeve-reference-mark portion 152. The third sleeve-reference-mark portion 156 extends from the first sleeve-reference-mark portion 152, opposite the second sleeve-reference-mark portion 154.

As illustrated in FIGS. 10 and 12, in one or more examples, prior to formation of the bulb 110, the first sleeve-reference-mark portion 152 is the annular portion 144 of the external surface 146 of the tubular body 104 formed or defined by the annular recess 218. The second sleeve-reference-mark portion 154 is a first annular shoulder portion of the tubular body 104 that extends from the first sleeve-reference-mark portion 152 approximately perpendicular to the sleeve axis 116. The third sleeve-reference-mark portion 156 is a second annular shoulder portion of the tubular body 104 that extends from the first sleeve-reference-mark portion 152 approximately perpendicular to the sleeve axis 116.

As illustrated in FIG. 11, after formation of the bulb 110, the first sleeve-reference-mark portion 152, the second sleeve-reference-mark portion 154, and the third sleeve-reference-mark portion 156 expand outwardly such that the second sleeve-reference-mark portion 154 extends from the first sleeve-reference-mark portion 152 along the sleeve axis 116 and the third sleeve-reference-mark portion 156 extends from the first sleeve-reference-mark portion 152 along the sleeve axis 116, opposite the second sleeve-reference-mark portion 154. In one or more examples, the first sleeve-reference-mark portion 152, the second sleeve-reference-mark portion 154, and the third sleeve-reference-mark portion 156 are at least approximately parallel to each other and/or at least approximately perpendicular to the sleeve axis 116. In one or more examples, the first sleeve-referencemark portion 152, the second sleeve-reference-mark portion 154, and the third sleeve-reference-mark portion 156 are located on the third bulb side 198 of the bulb 110.

In one or more examples, before formation of the bulb 110 (e.g., as shown in FIGS. 10 and 12), the second sleeve-reference-mark portion 154 and the third sleeve-reference-mark portion 156 are not visible, for example, in a direction perpendicular to the sleeve axis 116. For example, the second sleeve-reference-mark portion 154 and the third sleeve-reference-mark portion 156 are obscured due to the first annular shoulder, upon which the second sleeve-reference-mark portion 154 is located, and the second annular shoulder, upon which the third sleeve-reference-mark portion 156 is located, being perpendicular to the sleeve axis 116. After formation of the bulb 110 (e.g., as shown in FIG. 11), the second sleeve-reference-mark portion 154 and the third sleeve-reference-mark portion 156 being exposed; the first sleeve-reference-mark portion 152, the second sleeve-reference-mark portion 154, and the third sleeve-reference-mark portion 156 being at least approximately parallel to each other; the first sleeve-reference-mark portion 152, the second sleeve-reference-mark portion 154, and the third sleeve-reference-mark portion 156 being at least approximately perpendicular to the sleeve axis 116; and/or the first sleeve-reference-mark portion 152, the second sleeve-reference-mark portion 154, and the third sleeve-reference-mark portion 156 being located on (e.g., extending circumferentially around) the third bulb side 198 of the bulb 110 visually indicates the correct formation of the bulb 110.

In one or more examples, the first sleeve-reference-mark portion 152 includes a first physical characteristic. The second sleeve-reference-mark portion 154 includes a second physical characteristic. The third sleeve-reference-mark portion 156 includes a third physical characteristic. In one or more examples, the first physical characteristic is different than the second physical characteristic and the third physical characteristic, such that the first sleeve-reference-mark portion 152 is visibly distinct and easily discernible from the second sleeve-reference-mark portion 154 and the third sleeve-reference-mark portion 156. In one or more examples, the first physical characteristic, the second physical characteristic, and the third physical characteristic are different, such that the first sleeve-reference-mark portion 152, the second sleeve-reference-mark portion 154, and the third sleeve-reference-mark portion 156 are visibly distinct and easily discernible from each other.

Referring to FIGS. 13 and 14, in one or more examples, the visual indicator 112 includes the sleeve reference mark 142 and a second sleeve reference mark 192. The second sleeve reference mark 192 is located on the external surface 146 of the tubular body of the sleeve 102. In these examples, the correct formation of the bulb 110 is established by a combination of the location of the sleeve reference mark 142 relative to the bulb 110 and a location of the second sleeve reference mark 192 relative to a break 158 between a portion of the tubular body 104 and the bulb 110. After formation of the bulb 110 (e.g., as shown in FIG. 14), a combination of the sleeve reference mark 142 being located along the middle of the bulb 110 and/or being perpendicular to the sleeve axis 116 and the second sleeve reference mark 192 being located along the break 158 between the portion of the tubular body 104 and the bulb 110 visually indicates the correct formation of the bulb 110. Conversely, after formation of the bulb 110, at least one of the sleeve reference mark 142 not being located along the middle of the bulb 110 and/or not being perpendicular to the sleeve axis 116 and/or the second sleeve reference mark 192 not being located along the break 158 between the portion of the tubular body 104 and the bulb 110 visually indicates the incorrect formation of the bulb 110.

For the purpose of the present disclosure, the break 158 between a portion of the tubular body 104 and the bulb 110 refers to a bend, crease, or fold formed in the tubular body 104 that is formed upon expansion of a portion of the tubular body 104 and delineates the portion of the tubular body 104 (e.g., a second tubular-body portion 186) and the bulb 110 (e.g., the second bulb side 196).

In one or more examples, second sleeve reference mark 192 is annular, circumscribes the sleeve axis 116, and/or extends circumferentially around a portion of an external surface 146 of the tubular body 104. As an example, the second sleeve reference mark 192 is an annular portion (e.g., a strip) of the external surface 146 of the tubular body 104 of the sleeve 102 that is located toward between the sleeve reference mark 142 and the second sleeve end 120 (e.g., as shown in FIG. 13).

Figure 15:
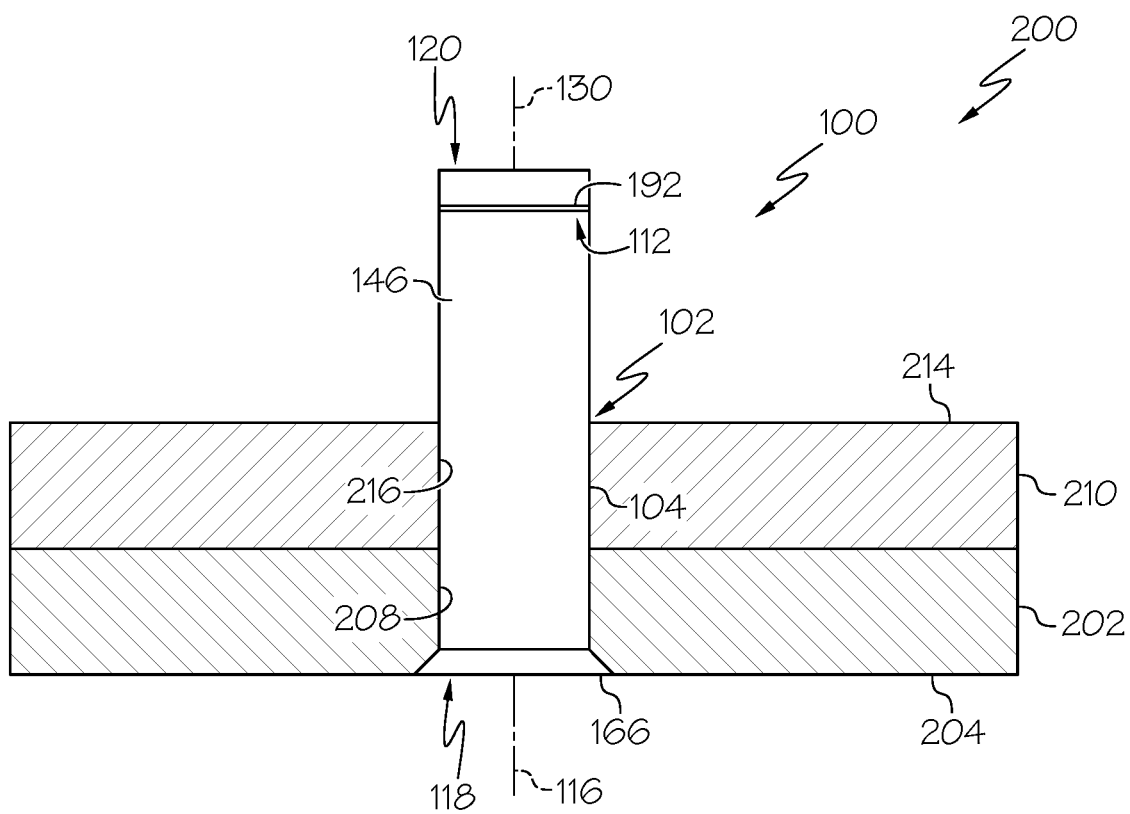
FIG. 15 is a schematic, elevation view, in partial section, of an example of the fastener shown in FIG. 1, depicted in an initially installed state.
Figure 16:
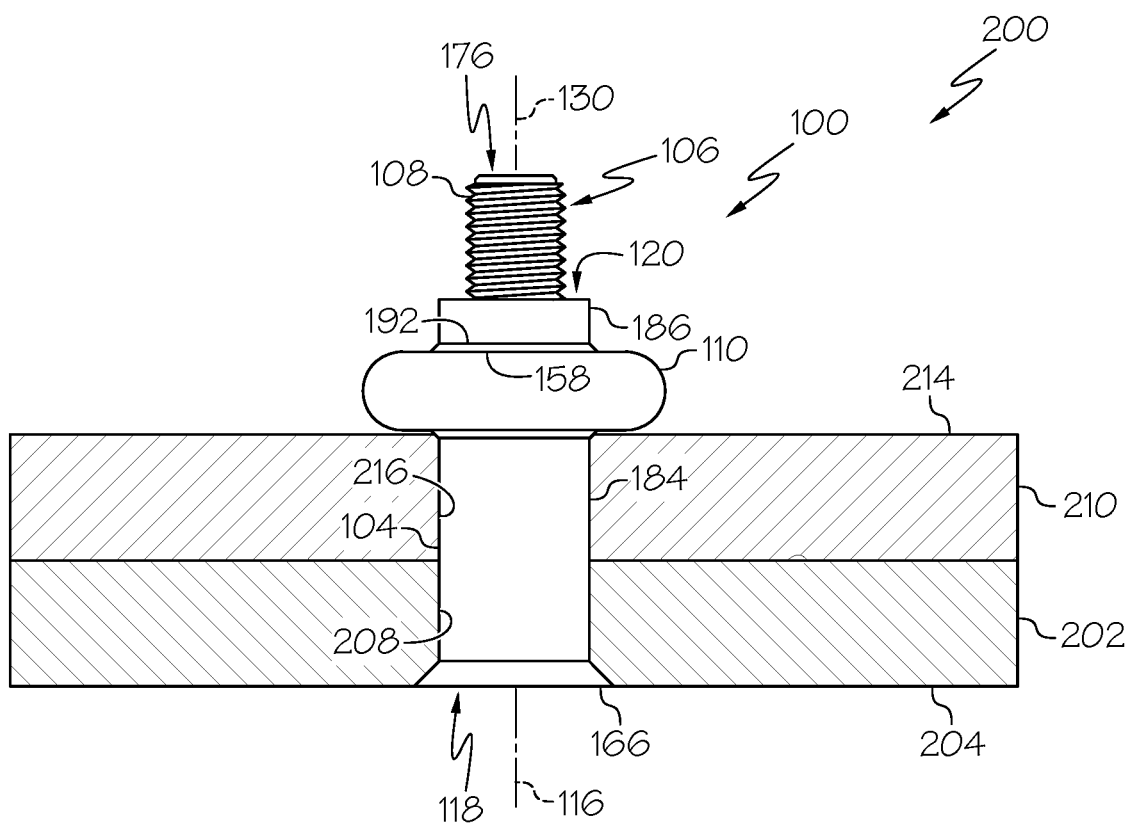
FIG. 16 is a schematic, elevation view, in partial section, of the example of the fastener shown in FIG. 15, depicted in a completely installed state.

Referring to FIGS. 15 and 16, in one or more examples, the visual indicator 112 includes only the second sleeve reference mark 192. The second sleeve reference mark 192 is located on the tubular body 104 of the sleeve 102. The correct formation of the bulb 110 is established by the location of the second sleeve reference mark 192 relative to the break 158 between a portion of the tubular body and the bulb 110. After formation of the bulb 110 (e.g., as shown in FIG. 16), the second sleeve reference mark 192 being located along the break 158 between the portion of the tubular body 104 and the bulb 110 visually indicates the correct formation of the bulb 110. Conversely, after formation of the bulb 110, the second sleeve reference mark 192 not being located along the break 158 between the portion of the tubular body 104 and the bulb 110 visually indicates the incorrect formation of the bulb 110.

Referring generally to FIGS. 1-16 and particularly to FIG. 17, in one or more examples, visual indicator 112 of the fastener 100 includes a combination of or a plurality of the different types of reference marks 114, as described herein above, that provide the visual verification of correct formation of the bulb 110 (e.g., as shown in FIG. 17). Thus, in one or more examples, the visual indicator 112 provides a multi-dimensional indication or a plurality of different visual cues to signal correct and/or complete formation of the bulb 110.

In one or more examples, the sleeve 102 includes the sleeve axis 116, the first sleeve end 118, and the second sleeve end 120. The visual indicator 112 includes the shank reference mark 122 that is located on the shank 108 of the pin 106. The visual indicator 112 also includes the sleeve reference mark 142 that located on the tubular body 104 of the sleeve 102. The visual indicator 112 further includes the second sleeve reference mark 192 that is located on the tubular body 104 of the sleeve 102. The correct formation of the bulb 110 is established by the location of the second sleeve end 120 relative to the shank reference mark 122, the location of the sleeve reference mark 142 relative to the bulb 110, and the location of the second sleeve reference mark 192 relative to the break 158 between a portion of the tubular body and the bulb 110. After formation of the bulb 110 (e.g., as shown in FIG. 17), at least a portion of the shank reference mark 122 being exposed by the second sleeve end 120, the sleeve reference mark 142 being located along the middle of the bulb 110 and being perpendicular to the sleeve axis 116, and the second sleeve reference mark 192 being located along the break 158 between the portion of the tubular body 104 and the bulb 110 visually indicate the correct formation of the bulb 110. Conversely, after formation of the bulb 110, at least a portion of the shank reference mark 122 not being exposed by the second sleeve end 120, the sleeve reference mark 142 not being located along the middle of the bulb 110 and/or not being perpendicular to the sleeve axis 116, and/or the second sleeve reference mark 192 not being located along the break 158 between the portion of the tubular body 104 and the bulb 110 may visually indicate the incorrect formation of the bulb 110.

Referring to FIGS. 18-20, in one or more examples, the tubular body 104 includes a first external cylindrical surface 160 (e.g., a first cylindrical portion) that extends along the sleeve axis 116. The tubular body 104 also includes an external tapered surface 162 (e.g., a tapered portion) that extends from the first external cylindrical surface 160 along the sleeve axis 116. The tubular body 104 further includes a second external cylindrical surface 164 (e.g., a second cylindrical portion) that extends from the external tapered surface 162 along the sleeve axis 116. In these examples, the visual indicator 112 includes the sleeve reference mark 142 that is located on at least a portion of the external tapered surface 162 of the tubular body of the sleeve 102. In one or more examples, the sleeve reference mark 142 is located on an entirety of the external tapered surface 162. In one or more examples, the sleeve reference mark 142 is located on a portion of the external tapered surface 162. The correct formation of the bulb 110 is established by a location of the sleeve reference mark 142 relative to the bulb 110. Before formation of the bulb 110 (e.g., as shown in FIG. 18), the sleeve reference mark 142 is visible. After formation of the bulb 110 (e.g., as shown in FIGS. 19 and 20), the sleeve reference mark 142 being not visible visually indicates the correct formation of the bulb 110.

Figure 21:
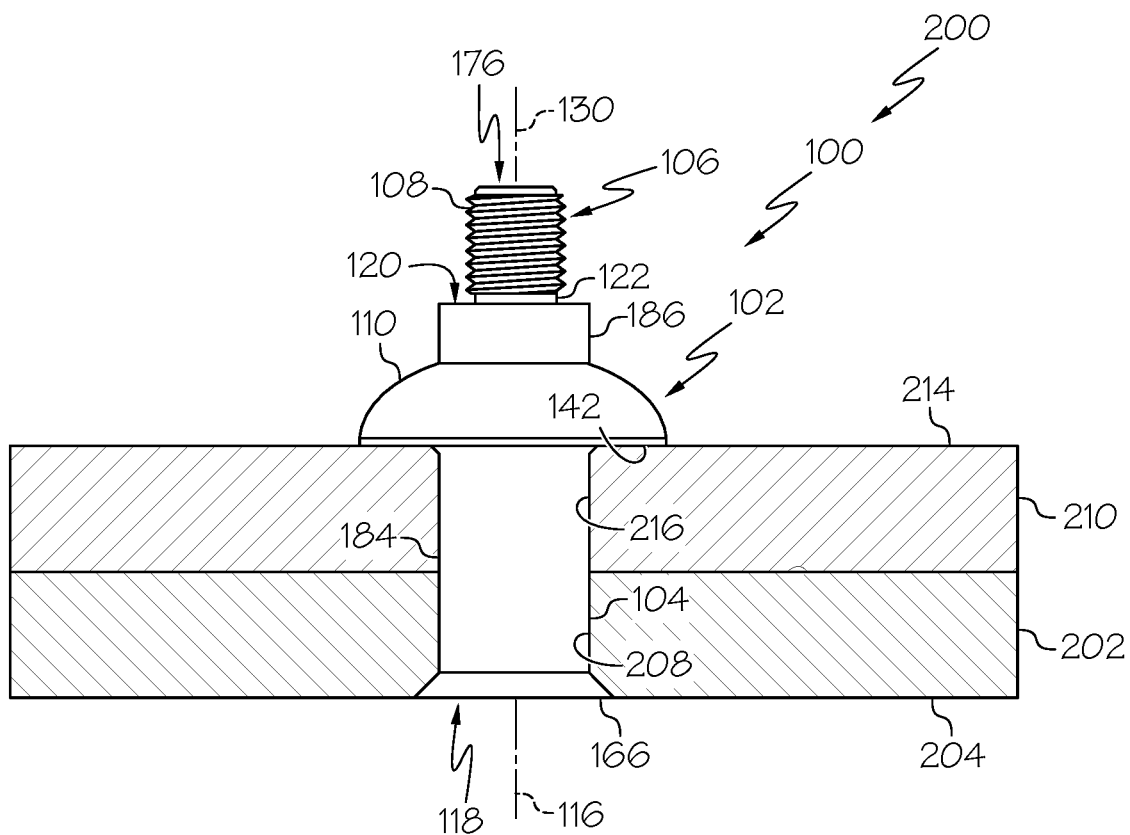
FIG. 21 is a schematic, elevation view, in partial section, of an example of the fastener, depicted in a completely installed state.

As shown in FIGS. 19-21, in one or more examples, the bulb 110 has a generally hemispherical or frustoconical shape that circumscribes and extends outward from the sleeve axis 116. In one or more examples, when correctly formed, the bulb 110 is at least approximately symmetric about the sleeve axis 116.

Referring briefly to FIG. 19, in one or more examples, when correctly formed, the bulb 110 includes the first bulb side 194 (e.g., first surface) that is at least approximately planar and that is in contact with the second-workpiece second side 214. For example, after compression of the tubular body 104 and formation of the bulb 110, the external tapered surface 162 forms at least a portion of the first bulb side 194. The bulb 110 includes the second bulb side 196 (e.g., second surface) that extends from the first bulb side 194 along the sleeve axis 116. In one or more examples, the second bulb side 196 is convex or is curved outward relative to an axis that is perpendicular to the sleeve axis 116. As such, upon correct formation of the bulb 110, the sleeve reference mark 142 is hidden between the bulb 110 (e.g., the first bulb side 194) and the second-workpiece second side 214 (e.g., as shown in FIG. 20).

Referring to FIG. 21, in one or more examples, the visual indicator 112 includes the sleeve reference mark 142 that is located on the external tapered surface 162 of the tubular body 104 of the sleeve 102 and the shank reference mark 122 that is located on the shank 108 of the pin 106. The correct formation of the bulb 110 is established by a location of the sleeve reference mark 142 relative to the bulb 110 and a location of the second sleeve end 120 relative to the shank reference mark 122. Before formation of the bulb 110, the sleeve reference mark 142 is visible and the shank reference mark 122 is not visible (e.g., is covered by the tubular body 104 of the sleeve 102). After formation of the bulb 110 (e.g., as shown in FIG. 21), the sleeve reference mark 142 being not visible and at least a portion of the shank reference mark 122 being exposed by the second sleeve end 120 visually indicates the correct formation of the bulb 110. Conversely, after formation of the bulb 110, a portion of the sleeve reference mark 142 being visible and/or at least a portion of the shank reference mark 122 being covered by the second sleeve end 120 visually indicates the incorrect formation of the bulb 110.

Figure 22:
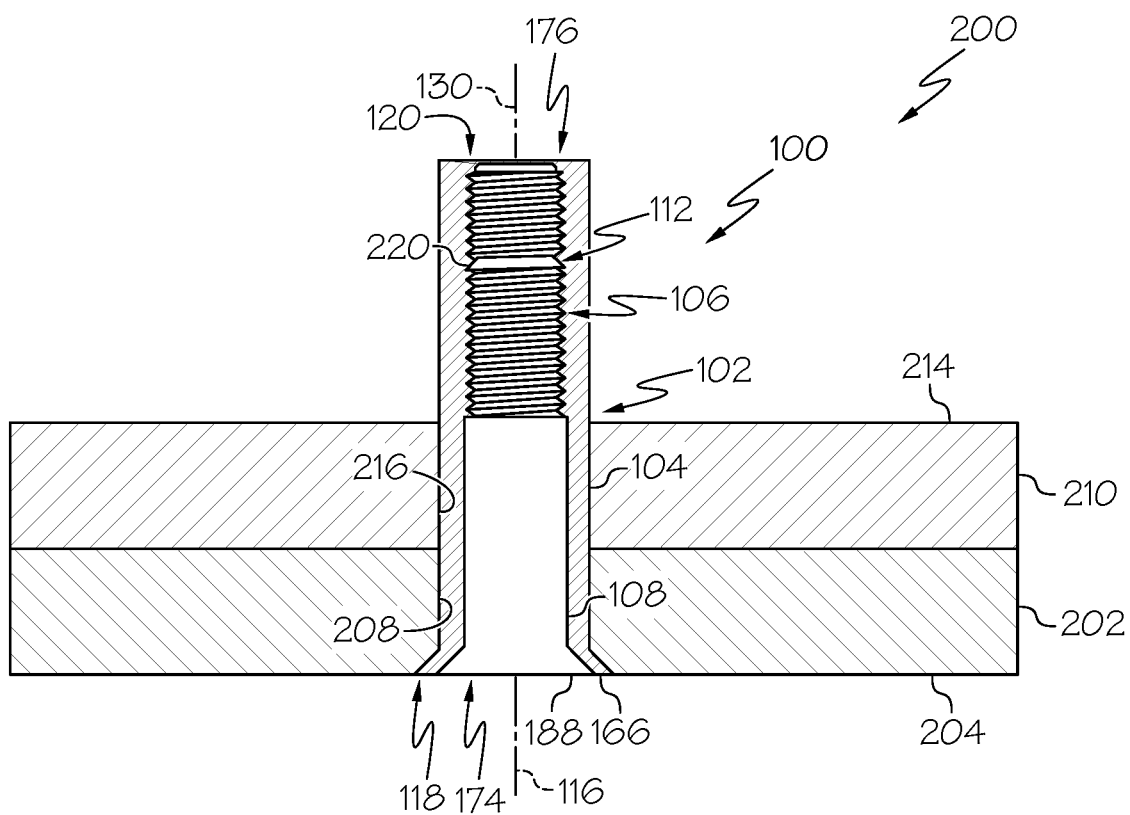
FIG. 22 is a schematic, elevation view, in partial section, of an example of the fastener, depicted in an initially installed state.
Figure 23:
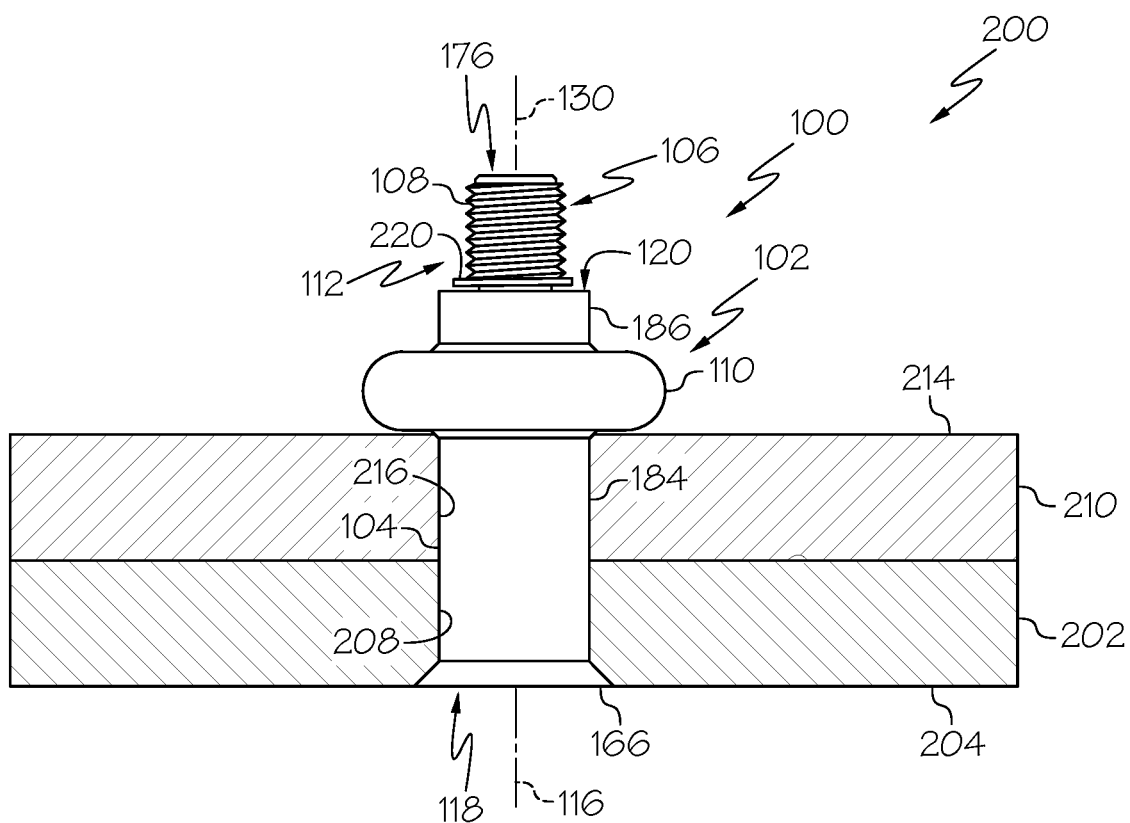
FIG. 23 is a schematic, elevation view, in partial section, of the example of the fastener shown in FIG. 23, depicted in a completely installed state.

Referring to FIGS. 22 and 23, in one or more examples, the visual indicator 112 includes or takes the form of a reference feature 220 that changes shape or otherwise deploys upon correct formation of the bulb 110. In one or more examples, the reference feature 220 is a tapered, conical spring collar that is positioned around the shank 108 of the pin 106 between an external surface of the shank 108 and an internal surface of the tubular body 104. The correct formation of the bulb 110 is established by deployment of the reference feature 220. Before formation of the bulb 110, the reference feature 220 is loaded between the shank 108 and the tubular body 104 (e.g., as shown in FIG. 22). After formation of the bulb 110, the reference feature 220 being deployed and/or being visible by the position of the second sleeve end 120 visually indicates the correct formation of the bulb 110 (e.g., as shown in FIG. 23). Conversely, after formation of the bulb 110, the reference feature 220 not being deployed and/or not being visible by the position of the second sleeve end 120 visually indicates the incorrect formation of the bulb 110.

Figure 25:
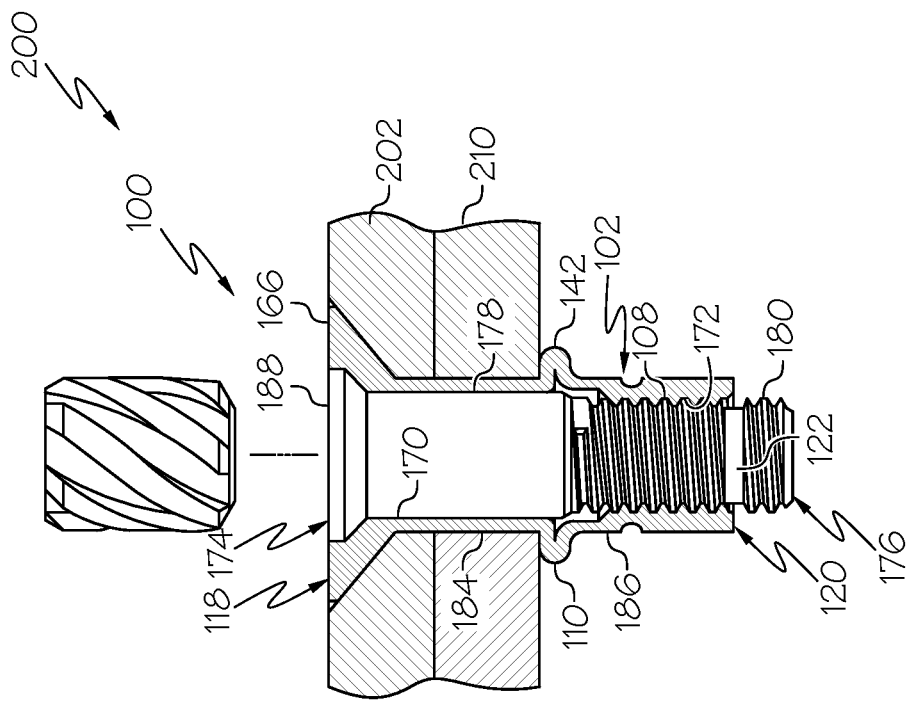
FIG. 25 is a schematic, sectional view of the example of the fastener shown in FIG. 24, depicted in a completely installed state.
Figure 24:
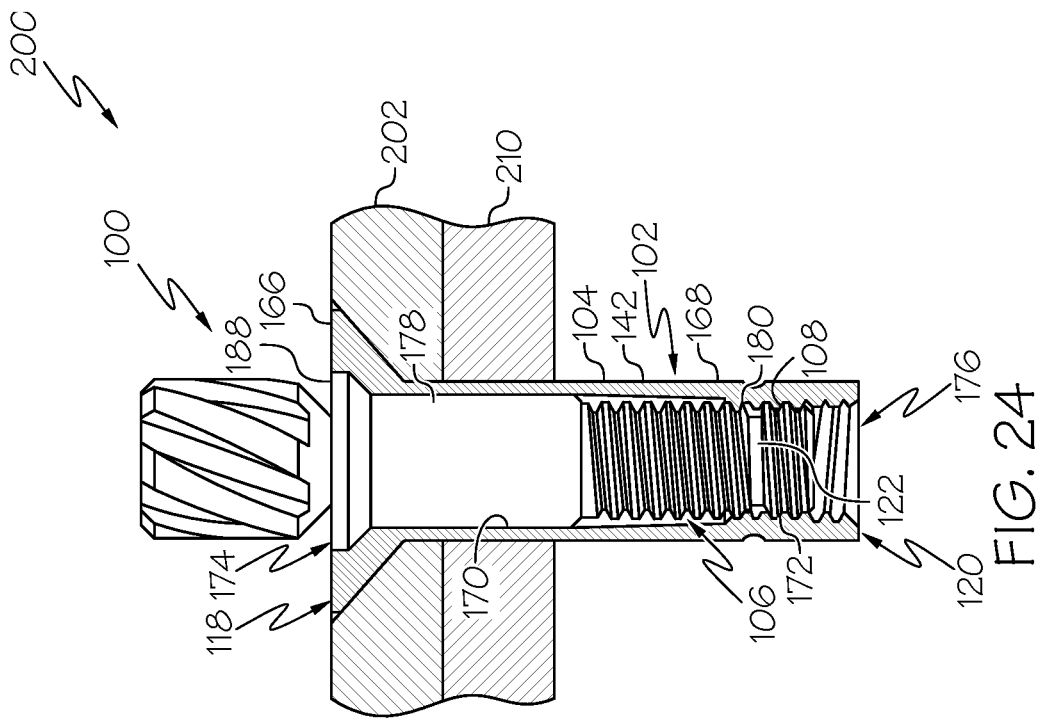
FIG. 24 is a schematic, sectional view of an example of the fastener, depicted in an initially installed state.

Referring to FIGS. 24 and 25, in one or more examples, the sleeve 102 includes the sleeve axis 116, the first sleeve end 118, and the second sleeve end 120 that is opposite the first sleeve end 118 along the sleeve axis 116. The sleeve 102 also includes a sleeve head 166 that is coupled to the tubular body 104, for example, at the first sleeve end 118. The tubular body 104 of the sleeve 102 includes an external cylindrical surface 168 that extends from the sleeve head 166 along the sleeve axis 116. The tubular body 104 also includes an internal cylindrical surface 170 that extends from the sleeve head 166 along the sleeve axis 116. The tubular body 104 further includes an internal threaded surface 172 that extends from the internal cylindrical surface 170 along the sleeve axis 116. The pin 106 includes the pin axis 130, the first pin end 174, and the second pin end 176 that is opposite the first pin end 174 along the pin axis 130. The pin 106 also includes a pin head 188 that is coupled to the shank 108, for example, at the first pin end 174, and that is configured to be seated within the sleeve head 166 of the sleeve 102. The shank 108 of the pin 106 includes a cylindrical surface 178 that extends from the pin head 188 along the pin axis 130 and that is configured to be received within the internal cylindrical surface 170 of the tubular body of the sleeve 102. The shank 108 of the pin 106 also includes a threaded surface 180 that extends from the cylindrical surface 178 along the pin axis 130 and that is configured to threadedly engage the internal threaded surface 172 of the tubular body of the sleeve 102. The portion of the tubular body 104 that includes the internal cylindrical surface 170 is configured to deform into the bulb 110 (e.g., as shown in FIG. 25) in response to a rotational force applied to the pin 106.

Referring still to FIGS. 24 and 25, in one or more examples, the visual indicator 112 includes the shank reference mark 122 that is located on the threaded surface 180 of the shank 108 of the pin 106. The correct formation of the bulb 110 is established by a location of the second sleeve end 120 relative to the shank reference mark 122. Before formation of the bulb 110 (e.g., as shown in FIG. 24), the shank reference mark 122 is covered by the sleeve 102. After formation of the bulb 110 (e.g., as shown in FIG. 25), at least a portion of the shank reference mark 122 being exposed by the second sleeve end 120 visually indicates the correct formation of the bulb 110.

Referring still to FIGS. 24 and 25, in one or more examples, the visual indicator 112 includes the sleeve reference mark 142 that is located on the external cylindrical surface 168 of the tubular body 104 of the sleeve 102. The correct formation of the bulb 110 is established by a location of the sleeve reference mark 142 relative to the bulb 110. After formation of the bulb 110 (e.g., as shown in FIG. 25), the sleeve reference mark 142 being located along the middle of the bulb 110 and/or being perpendicular to the sleeve axis 116 visually indicates the correct formation of the bulb 110.

While not explicitly illustrated, the fastener 100 may include other configurations of bulb-type fasteners and/or other mechanisms for causing deformation of the tubular body 104 to form the bulb 110, such as a blind rivet. In one or more examples, the pin 106 is a mandrel and includes a mandrel head located at the second pin end 176. The cylindrical surface 178 (e.g., cylindrical portion) of the shank 108 of the pin 106 extends from the first pin end 174 to the second pin end 176 (e.g., the shank 108 is non-threaded). The sleeve 102 is compressed and a portion of the tubular body 104 expands outwardly to form the bulb 110 in response to a tension (e.g., pulling) force applied to the first pin end 174.

Figure 26A:
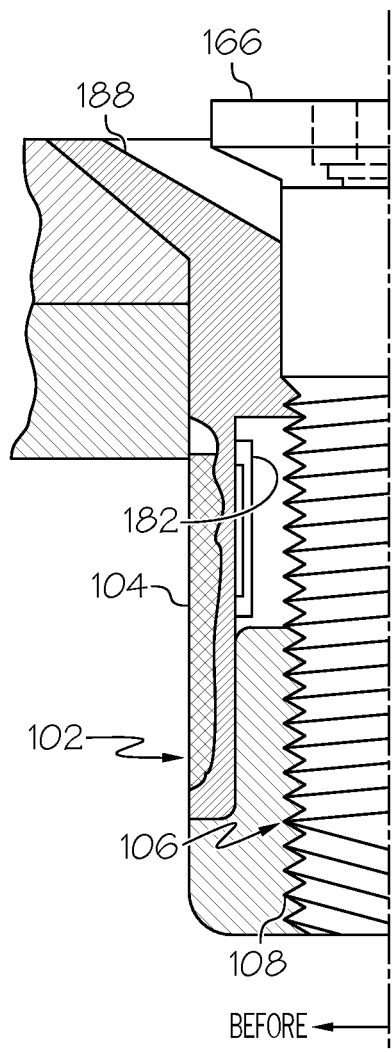
FIGS. 26A and 26B are schematic, sectional views of an example of the fastener, depicting the fastener before formation of a bulb and after formation of the bulb.
Figure 26B:
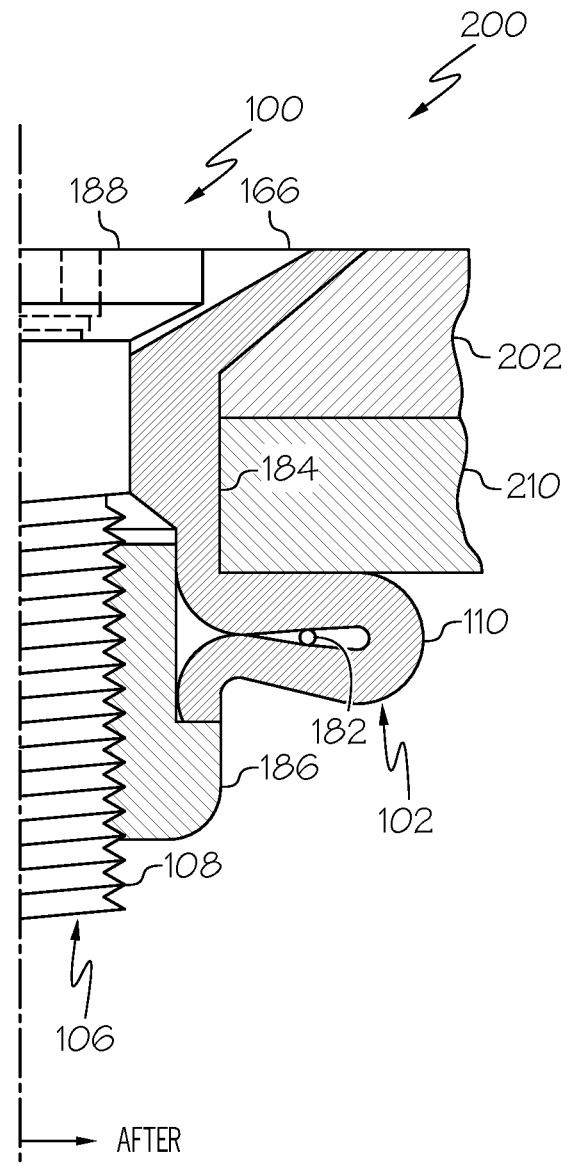

Referring to FIGS. 26A and 26B, in one or more examples, the fastener 100 includes a haptic indicator 182. In one or more examples, the haptic indicator 182 is coupled to the tubular body 104 of the sleeve 102 and is located between the shank 108 and the internal surface of the tubular body 104. The haptic indicator 182 is configured to provide a haptic response upon the correct formation of the bulb 110. Generally, the haptic response or feedback provided by the haptic indicator 182 takes the form of a change in condition that is perceptible by the end-user, such as a reduction in force required to rotate the pin 106 and compress the tubular body 104 that can be felt by the end-use, a "pop" or "snap" sound that is heard by the end-use, or the like.

As illustrated in FIG. 26A, in one or more examples, the haptic indicator 182 includes or takes the form of a strip of frangible material that is coupled at each end to the internal surface of the tubular body 104 along a portion of the tubular body 104 that is deformed during formation of the bulb 110. The strip has a proper geometry and sufficient flexibility to permit compression of the tubular body 104 and expansion of the portion of the tubular body 104 during formation of the bulb 110. Upon formation of the bulb 110, the strip is configured to break or snap, thus providing the haptic response indicating complete formation of the bulb 110.

As illustrated in FIG. 26B, in one or more examples, the haptic indicator 182 includes or takes the form of a sphere of frangible material that is located in an open region between the internal surface of the tubular body 104 and the shank 108 along a portion of the tubular body 104 that is deformed during formation of the bulb 110. The sphere has a proper geometry to permit compression of the tubular body 104 and expansion of the portion of the tubular body 104 during formation of the bulb 110. Upon formation of the bulb 110, the sphere is configured to break or pop, thus providing the haptic response indicating complete formation of the bulb 110.

Referring now to FIGS. 3, 5, 7, 9, 11, 14, 16, 17, 19-21, 23, 25 and 26B, which illustrate the completed assembly 200 in which the fastener 100 is completely installed to secure the first workpiece 202 and the second workpiece 210 together. In one or more examples, the sleeve 102 includes the sleeve head 166. In one or more examples, the sleeve head 166 is located at the first sleeve end 118. In one or more examples, the sleeve head 166 is seated in the first aperture 208 at the first-workpiece first side 204.

In one or more examples, upon complete formation of the fastener 100 and formation of the assembly 200, the sleeve 102 includes a first tubular-body portion 184, the bulb 110, and a second tubular-body portion 186. The first tubular-body portion 184 extends from the sleeve head 166 along the sleeve axis 116. The first tubular-body portion 184 is received within the first aperture 208 and the second aperture 216. The bulb 110 extends from the first tubular-body portion 184 along the sleeve axis 116. The bulb 110 is engaged with the second-workpiece second side 214. The second tubular-body portion 186 extends from the bulb 110 along the sleeve axis 116 to the second sleeve end 120.

In one or more examples, the pin 106 includes the pin head 188. In one or more examples, the pin head 188 is located at the first pin end 174. In one or more examples, the pin head 188 is seated in the sleeve head 166. In one or more examples, the pin 106 includes the shank 108. In one or more examples, the shank 108 extends from the pin head 188 along the pin axis 130 to the second pin end 176. The shank 108 is received within the first tubular-body portion 184, the bulb 110, and the second tubular-body portion 186 of the sleeve 102.

The visual indicator 112 provides the visual verification of correct formation of the bulb 110 and, thus, complete and/or correct installation of the fastener 100.

Referring to FIGS. 2-7, 17 and 21, in one or more examples, a portion of the shank 108 of the pin 106 extends beyond the second sleeve end 120. The visual indicator 112 includes the shank reference mark 122 that is located on the portion of the shank 108 of the pin 106. The correct formation of the bulb 110 is established by a location of the second sleeve end 120 relative to the shank reference mark 122. At least a portion of the shank reference mark 122 being exposed by the second sleeve end 120 visually indicates the correct formation of the bulb 110 (e.g., as shown in FIGS. 3, 5, 7, 17 and 21).

Referring to FIGS. 8-14, in one or more examples, the visual indicator 112 includes the sleeve reference mark 142 that is located on the bulb 110 of the sleeve 102. The correct formation of the bulb 110 is established by a location of the sleeve reference mark 142 relative to the bulb 110. The sleeve reference mark 142 being located along a middle of the bulb 110 and being perpendicular to the sleeve axis 116 visually indicates the correct formation of the bulb 110 (e.g., as shown in FIGS. 9, 11 and 14).

Referring to FIGS. 13-16, in one or more examples, the visual indicator 112 includes the second sleeve reference mark 192 that is located on the sleeve 102. The correct formation of the bulb 110 is established by a location of the second sleeve reference mark 192 relative to the break 158 between the second tubular-body portion of the sleeve 102 and the bulb 110 of the sleeve 102. The second sleeve reference mark 192 being located along the break 158 between the second tubular-body portion and the bulb 110 visually indicates the correct formation of the bulb 110 (e.g., as shown in FIGS. 14 and 16).

Referring to FIGS. 18-20, in one or more examples, the visual indicator 112 includes the sleeve reference mark 142 located on a portion of the bulb 110. The correct formation of the bulb 110 is established by a location of the sleeve reference mark 142 relative to the bulb 110. The sleeve reference mark 142 being not visible visually indicates the correct formation of the bulb 110.

Figure 27:
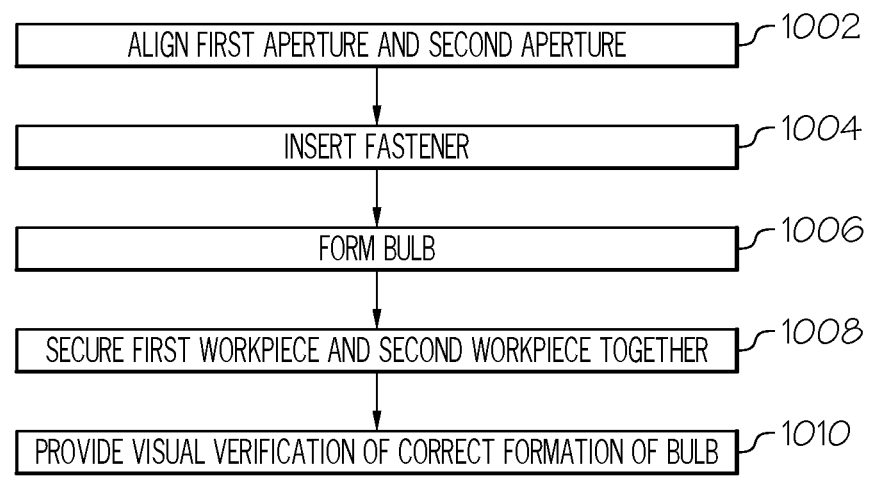
FIG. 27 is a flow diagram of an example of a method for fastening workpieces together.

Referring generally to FIGS. 1-25, 26A and 26B and particularly to FIG. 27, by way of examples, the present disclosure is further directed to a method 1000 for fastening the first workpiece 202 and the second workpiece 210 together. Implementations of the method 1000 use the fastener 100 to secure the first workpiece 202 and the second workpiece 210 together to form the assembly 200. Implementations of the method 1000 also use the fastener 100 to visually verify, indicate, or otherwise confirm correct and/or complete installation of the fastener 100.

Referring to FIGS. 1-25, 26A and 26B, in one or more examples, the first workpiece 202 includes the first-workpiece first side 204, the first-workpiece second side 206, and the first aperture 208 that extends, inclusively, between the first-workpiece first side 204 and the first-workpiece second side 206. The second workpiece 210 includes the second-workpiece first side 212, the second-workpiece second side 214, and the second aperture 216 that extends, inclusively, between the second-workpiece first side 212 and the second-workpiece second side 214.

Referring to FIG. 27, in one or more examples, the method 1000 includes a step of (block 1002) aligning the first aperture 208 and the second aperture 216. The method 1000 includes a step of (block 1004) inserting the fastener 100 into the first aperture 208 and the second aperture 216 from the first-workpiece first side 204 of the first workpiece 202.

Referring to FIGS. 1-14, in one or more examples, the fastener 100 includes the sleeve 102, the pin 106, and the visual indicator 112. The sleeve 102 includes the tubular body 104. A portion of the tubular body 104 is received by the first aperture 208 and the second aperture 216. The pin 106 includes the shank 108. A portion of the shank 108 is received by the tubular body 104 of the sleeve 102. The visual indicator 112 is located on at least one of the tubular body 104 of the sleeve 102 and the shank 108 of the pin 106.

Referring again to FIG. 27, in one or more examples, the method 1000 includes a step of (block 1006) forming the bulb 110 and a step of (block 1008) securing the first workpiece 202 and the second workpiece 210 together with the fastener 100. The bulb 110 is formed by a portion of the tubular body 104 of the sleeve 102 and clamps the first workpiece 202 and the second workpiece 210 together.

In one or more examples, according to the method 1000, the step of (block 1006) forming the bulb 110 includes a step of applying a force to the tubular body 104 of the sleeve 102 by the shank 108 of the pin 106, a step of compressing the tubular body 104 of the sleeve 102 in response to the force, and a step of deforming a portion of the tubular body 104 to form the bulb 110. Upon complete installation of the fastener 100, the bulb 110 engages the second-workpiece second side 214 of the second workpiece 210. Deformation of the portion of the tubular body 104 into the bulb 110 is achieved in response to the force being applied to the tubular body 104 of the sleeve 102 by the shank 108 of the pin 106.

Referring still to FIG. 27, in one or more examples, the method 1000 includes a step of (block 1010) providing a visual verification of correct formation of the bulb 110 using the visual indicator 112.

Referring to FIGS. 2-7 and 17, in one or more examples, according to the method 1000, the sleeve 102 includes the sleeve axis 116, the first sleeve end 118, and the second sleeve end 120 that is opposite the first sleeve end 118 along the sleeve axis 116. The visual indicator 112 includes the shank reference mark 122 that is located on the shank 108 of the pin 106.

Referring to FIG. 27, in one or more examples, according to the method 1000, the step of (block 1010) providing the visual verification of the correct formation of the bulb 110 includes a step of locating the second sleeve end 120 relative to the shank reference mark 122 to expose at least a portion of the shank reference mark 122 by the second sleeve end 120.

Referring to FIGS. 8-14 and 17, in one or more examples, according to the method 1000, the sleeve 102 includes the sleeve axis 116. The visual indicator 112 includes the sleeve reference mark 142 that is located on the tubular body 104 of the sleeve 102.

Referring to FIG. 27, in one or more examples, according to the method 1000, the step of (block 1010) providing the visual verification of the correct formation of the bulb 110 includes a step of locating the sleeve reference mark 142 along a middle of the bulb 110 and/or perpendicular to the sleeve axis 116.

Referring to FIG. 13-17, in one or more examples, according to the method 1000, the visual indicator 112 includes the second sleeve reference mark 192 that is located on the tubular body 104 of the sleeve 102.

Referring to FIG. 27, in one or more examples, according to the method 1000, the step of (block 1010) providing the visual verification of the correct formation of the bulb 110 includes a step of locating the second sleeve reference mark 192 along the break 158 between a portion of the tubular body and the bulb 110.

Referring to FIGS. 18-21, in one or more examples, according to the method 1000, the visual indicator 112 includes the sleeve reference mark 142 that is located on a portion of the bulb 110.

Referring to FIG. 27, in one or more examples, according to the method 1000, the step of (block 1010) providing the visual verification of the correct formation of the bulb 110 includes a step of locating the sleeve reference mark 142 between the bulb 110 and the second-workpiece second side 214.

Examples of the fastener 100, the assembly 200, and the method 1000 may be related to, or used in the context of, an aircraft manufacturing and service method and an aircraft Although an aerospace example is described, the examples and principles disclosed herein may be applied to other industries, such as the automotive industry, the space industry, the construction industry, and other design and manufacturing industries. Accordingly, in addition to aircraft, the examples and principles disclosed herein may apply to fastening workpieces together to form an assembly for other types of vehicles (e.g., land vehicles, marine vehicles, space vehicles, etc.), stand-alone structures, high-traffic surfaces, and other high-contact surfaces.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an"

should be understood as not excluding a plurality of features, elements, components or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B. and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-25, 26A and 26B, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-25, 26A and 26B, referred to above, need be included in every example and not all elements, features, and/or components described herein are necessarily depicted in each illustrative example. Accordingly, some of the elements, features, and/or components described and illustrated in FIGS. 1-25, 26A and 26B may be combined in various ways without the need to include other features described and illustrated in FIGS. 1-25, 26A and 26B, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-25, 26A and 26B, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-25, 26A and 26B, and such elements, features, and/or components may not be discussed in detail herein with reference to each of FIGS. 1-25, 26A and 26B. Similarly, all elements, features, and/or components may not be labeled in each of FIGS. 1-25, 26A and 26B, but reference numerals associated therewith may be utilized herein for consistency.

In FIG. 27, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIG. 27 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the fastener 100, the assembly 200, and the method 1000 have been shown and described, modifications may occur to those skilled in the art upon reading the specification. The present application includes such modifications and is limited only by the scope of the claims.

What is claimed is:

1. A fastener comprising:
   a sleeve comprising a tubular body;
   a pin comprising a shank, wherein at least a portion of the shank of the pin is configured to extend through the tubular body of the sleeve and to facilitate deformation of a portion of the tubular body into a bulb in response to a force applied to the tubular body of the sleeve by the shank of the pin; and
   a visual indicator configured to provide a visual verification of correct formation of the bulb, the visual indicator comprising at least one reference mark located on the shank of the pin.

2. The fastener of claim 1, wherein:
   the at least one reference mark is not visible before formation of the bulb; and
   the at least one reference mark is visible after the correct formation of the bulb.

3. The fastener of claim 1, wherein:
   the sleeve further comprises a sleeve axis, a first sleeve end, and a second sleeve end that is opposite the first sleeve end along the sleeve axis;
   the visual indicator comprises a shank reference mark located on the shank of the pin;
   the correct formation of the bulb is established by a location of the second sleeve end relative to the shank reference mark;
   before formation of the bulb, the shank reference mark is covered by the sleeve; and
   after formation of the bulb, at least a portion of the shank reference mark being exposed by the second sleeve end visually indicates the correct formation of the bulb.

4. The fastener of claim 3, wherein the shank reference mark comprises at least one of an annular recess formed in the shank of the pin and a physical characteristic of an annular portion of a surface of the shank of the pin.

5. The fastener of claim 4, wherein the physical characteristic of the annular portion of the surface of the shank of the pin comprises at least one of surface color, surface texture, and surface reflectivity.

6. The fastener of claim 3, wherein:
   the pin comprises a pin axis;
   the shank reference mark comprises a first shank-reference-mark end and a second shank-reference-mark end that is opposite the first shank-reference-mark end along the pin axis;
   the first shank-reference-mark end is located at a minimum limit for the correct formation of the bulb;
   the second shank-reference-mark end is located at a maximum limit for the correct formation of the bulb; and
   after formation of the bulb, the second sleeve end of the sleeve being located between the first shank-reference-mark end and the second shank-reference-mark end visually indicates the correct formation of the bulb.

7. The fastener of claim 6, wherein:
   the shank reference mark further comprises:
      a first shank-reference-mark portion that extends between the first shank-reference-mark end and the second shank-reference-mark end; and
      a second shank-reference-mark portion that extends from the first shank-reference-mark end along the pin axis; and
   after formation of the bulb, at least a portion of the second shank-reference-mark portion being exposed by the second sleeve end visually indicates that formation of the bulb is beyond the minimum limit for the correct formation of the bulb.

8. The fastener of claim 7, wherein:
   the first shank-reference-mark portion comprises a first physical characteristic;
   the second shank-reference-mark portion comprises a second physical characteristic; and
   the first physical characteristic and the second physical characteristic are different.

9. The fastener of claim 6, wherein:
   the shank reference mark further comprises:
      a first shank-reference-mark portion that extends between the first shank-reference-mark end and the second shank-reference-mark end; and
      a third shank-reference-mark portion that extends from the second shank-reference-mark end along the pin axis; and
   after formation of the bulb, at least a portion of the third shank-reference-mark portion being exposed by the second sleeve end visually indicates that formation of the bulb is beyond the maximum limit for the correct formation of the bulb.

10. The fastener of claim 9, wherein:
    the first shank-reference-mark portion comprises a first physical characteristic;
    the third shank-reference-mark portion comprises a third physical characteristic; and
    the first physical characteristic and the third physical characteristic are different.

11. The fastener of claim 6, wherein:
    the shank reference mark further comprises:
       a first shank-reference-mark portion that extends between the first shank-reference-mark end and the second shank-reference-mark end;
       a second shank-reference-mark portion that extends from the first shank-reference-mark end along the pin axis; and a third shank-reference-mark portion that extends from the second shank-reference-mark end along the pin axis;

after formation of the bulb, at least a portion of the second shank-reference-mark portion being exposed by the second sleeve end visually indicates that formation of the bulb is beyond the minimum limit for the correct formation of the bulb; and after formation of the bulb, at least a portion of the third shank-reference-mark portion being exposed by the second sleeve end visually indicates that formation of the bulb is beyond the maximum limit for the correct formation of the bulb.

12. The fastener of claim 11, wherein:
the first shank-reference-mark portion comprises a first physical characteristic;
the second shank-reference-mark portion comprises a second physical characteristic;
the third shank-reference-mark portion comprises a third physical characteristic; and
the first physical characteristic, the second physical characteristic, and the third physical characteristic are different.

13. A fastener comprising:
a sleeve comprising a tubular body;
a pin comprising a shank, wherein at least a portion of the shank of the pin is configured to extend through the tubular body of the sleeve and to facilitate deformation of a portion of the tubular body into a single bulb in response to a force applied to the tubular body of the sleeve by the shank of the pin; and
a visual indicator configured to provide a visual verification of correct formation of the bulb,
wherein:
the sleeve further comprises a sleeve axis;
the visual indicator comprises a sleeve reference mark located on the tubular body of the sleeve;
the correct formation of the bulb is established by a location of the sleeve reference mark relative to the bulb; and
after formation of the bulb, the sleeve reference mark being located along a middle of the bulb and being perpendicular to the sleeve axis visually indicates the correct formation of the bulb.

14. The fastener of claim 13, wherein:
the sleeve reference mark comprises a physical characteristic of an annular portion of an external surface of the tubular body of the sleeve; and
the physical characteristic of the annular portion of the external surface of the tubular body of the sleeve comprises at least one of surface color, surface texture, and surface reflectivity.

15. The fastener of claim 13, wherein:
the sleeve reference mark comprises a first sleeve-reference-mark end and a second sleeve-reference-mark end that is opposite the first sleeve-reference-mark end along the sleeve axis; and
after formation of the bulb, the first sleeve-reference-mark end and the second sleeve-reference-mark end being parallel to each other visually indicates the correct formation of the bulb.

16. The fastener of claim 13, wherein:
the sleeve reference mark further comprises:
a first sleeve-reference-mark portion;
a second sleeve-reference-mark portion that extends from the first sleeve-reference-mark portion; and a third sleeve-reference-mark portion that extends from the first sleeve-reference-mark portion, opposite the second sleeve-reference-mark portion;

before formation of the bulb, the second sleeve-reference-mark portion and the third sleeve-reference-mark portion are not visible; and after formation of the bulb, the second sleeve-reference-mark portion and the third sleeve-reference-mark portion being exposed visually indicates the correct formation of the bulb.

17. The fastener of claim 16, wherein:
the first sleeve-reference-mark portion comprises a first physical characteristic;
the second sleeve-reference-mark portion comprises a second physical characteristic;
the third sleeve-reference-mark portion comprises a third physical characteristic; and
the first physical characteristic is different than the second physical characteristic and the third physical characteristic.

18. The fastener of claim 16, wherein:
the visual indicator further comprises a second sleeve reference mark located on the tubular body of the sleeve;
the correct formation of the bulb is established by a location of the second sleeve reference mark relative to a break between a portion of the tubular body and the bulb; and
after formation of the bulb, the second sleeve reference mark being located along the break between the portion of the tubular body and the bulb visually indicates the correct formation of the bulb.

19. An assembly comprising:
a first workpiece comprising a first-workpiece first side, a first-workpiece second side, and a first aperture extending between the first-workpiece first side and the first-workpiece second side;
a second workpiece comprising a second-workpiece first side, a second-workpiece second side, and a second aperture extending between the second-workpiece first side and the second-workpiece second side, wherein at least a portion of the second workpiece overlaps at least a portion of the first workpiece and the second aperture is aligned with the first aperture; and
a fastener installed from the first-workpiece first side of the first workpiece for securing the first workpiece and the second workpiece together, wherein the fastener comprises:
a sleeve comprising:
a sleeve axis;
a first sleeve end;
a second sleeve end opposite the first sleeve end along the sleeve axis;
a sleeve head located at the first sleeve end and seated in the first aperture at the first-workpiece first side;
a first tubular-body portion extending from the sleeve head along the sleeve axis and received within the first aperture and the second aperture;
a bulb extending from the first tubular-body portion along the sleeve axis and engaged with the second-workpiece second side; and
a second tubular-body portion extending from the bulb along the sleeve axis to the second sleeve end;
a pin comprising:
a pin axis;

a first pin end;

a second pin end opposite the first pin end along the pin axis;

a pin head located at the first pin end and seated in the sleeve head; and a shank extending from the pin head along the pin axis to the second pin end and received within the first tubular-body portion, the bulb, and the second tubular-body portion; and an visual indicator configured to provide a visual verification of correct formation of the bulb.

20. A method for fastening a first workpiece and a second workpiece together, the first workpiece comprising a first-workpiece first side, a first-workpiece second side, and a first aperture extending between the first-workpiece first side and the first-workpiece second side and the second workpiece comprising a second-workpiece first side, a second-workpiece second side, and a second aperture extending between the second-workpiece first side and the second-workpiece second side, the method comprising steps of:

aligning the first aperture and the second aperture;

inserting a fastener into the first aperture and the second aperture from the first-workpiece first side of the first workpiece, wherein the fastener comprises:

a sleeve comprising a tubular body that is received by the first aperture and the second aperture;

a pin comprising a shank that is received by the tubular body of the sleeve; and a visual indicator located on at least one of the tubular body of the sleeve and the shank of the pin;

deforming a portion of the tubular body into a bulb that engages the second-workpiece second side of the second workpiece in response to a force applied to the tubular body of the sleeve by the shank of the pin; and providing a visual verification of correct formation of the bulb using the visual indicator.

* * * * *